US012632220B2

(12) United States Patent
Lee et al.

(10) Patent No.: US 12,632,220 B2
(45) Date of Patent: May 19, 2026

(54) APPARATUS AND METHOD WITH MULTIPLY-ACCUMULATE OPERATION

(71) Applicant: Samsung Electronics Co., Ltd., Suwon-si (KR)

(72) Inventors: Hyungwoo Lee, Seoul (KR); Seungchul Jung, Suwon-si (KR); Sang Joon Kim, Hwaseong-si (KR); Sungmeen Myung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1199 days.

(21) Appl. No.: 17/542,833

(22) Filed: Dec. 6, 2021

(65) Prior Publication Data

US 2022/0365752 A1     Nov. 17, 2022

(30) Foreign Application Priority Data

May 13, 2021    (KR) ......................... 10-2021-0061753

(51) Int. Cl.
*G06F 7/544*        (2006.01)
*G06G 7/16*         (2006.01)
(52) U.S. Cl.
CPC ............. *G06F 7/5443* (2013.01); *G06G 7/16* (2013.01); *G06F 2207/4824* (2013.01)
(58) Field of Classification Search
CPC ......... G06F 7/5443; G06F 17/16; G06G 7/16; G06G 7/18; G06G 7/22
See application file for complete search history.

(56) References Cited

U.S. PATENT DOCUMENTS

| | | | |
|---|---|---|---|
| 11,226,763 B2 * | 1/2022 | Le Gallo-Bourdeau ..................... G06F 3/0655 | |
| 12,327,591 B2 * | 6/2025 | Deshpande ........... G11C 11/412 | |
| 2005/0144210 A1 | 6/2005 | Simkins et al. | |
| 2011/0320768 A1 | 12/2011 | Pell et al. | |
| 2014/0172937 A1 * | 6/2014 | Linderman .............. G06G 7/16 708/607 | |
| 2015/0170025 A1 * | 6/2015 | Wu ........................ G06N 3/065 706/25 | |
| 2018/0095748 A1 | 4/2018 | Buchanan et al. | |
| 2019/0102170 A1 | 4/2019 | Chen et al. | |

(Continued)

FOREIGN PATENT DOCUMENTS

| | | |
|---|---|---|
| KR | 10-2018-0036587 A | 4/2018 |
| KR | 10-2020-0076571 A | 6/2020 |

(Continued)

OTHER PUBLICATIONS

Extended European Search Report Issued on Jul. 4, 2022, in counterpart European Patent Application No. 22151759.2 (8 Pages).

(Continued)

*Primary Examiner* — Matthew D Sandifer
(74) *Attorney, Agent, or Firm* — NSIP Law

(57)                ABSTRACT

A multiply-accumulate (MAC) computation circuit includes: a source bit cell block configured to determine a MAC operation result of an input signal based on a plurality of source bit cells; a replica bit cell block comprising a plurality of replica bit cells corresponding to the plurality of source bit cells; and a readout circuit configured to read out a digital value of the MAC operation result using the replica bit cell block.

30 Claims, 16 Drawing Sheets

(56)                  References Cited

U.S. PATENT DOCUMENTS

| 2019/0108193 | A1 | 4/2019 | Buchanan |
| 2019/0132602 | A1 | 5/2019 | Halawani et al. |
| 2020/0026989 | A1 | 1/2020 | Zhang et al. |
| 2020/0210369 | A1* | 7/2020 | Song ..................... G06F 9/3004 |
| 2020/0303003 | A1 | 9/2020 | Yanagisawa et al. |
| 2020/0356344 | A1 | 11/2020 | Cruz-Albrecht et al. |
| 2021/0110251 | A1 | 4/2021 | Gattani et al. |
| 2021/0366542 | A1 | 11/2021 | Lee et al. |

FOREIGN PATENT DOCUMENTS

| KR | 10-2021-0000313 A | 1/2021 |
| KR | 10-2021-0028063 A | 3/2021 |
| KR | 10-2021-0144417 A | 11/2021 |

OTHER PUBLICATIONS

Dong, Qing et al. "A 351TOPS/W and 372.4GOPS Compute-in-Memory SRAM Macro in 7nm FinFET CMOS for Machine-Learning Applications" *International Solid-State Circuits Conference Session 15 SRAM & COMPUTE-IN-MEMORY vol. 15, No. 3* 2020 (3 pages in English).
E. Sinangil, Mahmut et al. "A 7-nm Compute-in-Memory SRAM Macro Supporting Multi-Bit Input, Weight and Output and Achieving 351 TOPS/W and 372.4 Gops" IEEE Journal of Solid-State Circuits, vol. 56, No. Jan. 1, 2021 (11 pages in English).
Korean Office Action Issued on Aug. 26, 2025, in Counterpart Korean Patent Application No. 10-2021-0061753 (6 Pages in English, 8 Pages in Korean).

* cited by examiner $$y_i = f\left(\sum_{j=1}^{m} w_{j,i} \cdot x_j\right)$$

1

APPARATUS AND METHOD WITH MULTIPLY-ACCUMULATE OPERATION

CROSS-REFERENCE TO RELATED APPLICATIONS

This application claims the benefit under 35 USC § 119(a) of Korean Patent Application No. 10-2021-0061753, filed on May 13, 2021, in the Korean Intellectual Property Office, the entire disclosure of which is incorporated herein by reference for all purposes.

BACKGROUND

1. Field

The following description relates to an apparatus and method with a multiply-accumulate (MAC) operation.

2. Description of Related Art

A vector matrix multiplication operation, also known as a multiply-accumulate (MAC) operation, may have an influence on the performance of applications in various fields. For example, in machine learning and authentication operations of a neural network including multiple layers, a MAC operation may be performed. An input signal may be regarded to form an input vector and may be data for an image, a byte stream, or other data sets. An output vector may be obtained from a result of a MAC operation obtained by multiplying an input signal by a weight and accumulating a product of the input signal and the weight, and may be provided as an input vector for a next layer. When such a MAC operation is repeated for a plurality of layers, the neural network processing performance may depend on the performance of the MAC operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a multiply-accumulate (MAC) computation circuit includes: a source bit cell block configured to determine a MAC operation result of an input signal based on a plurality of source bit cells; a replica bit cell block comprising a plurality of replica bit cells corresponding to the plurality of source bit cells; and a readout circuit configured to read out a digital value of the MAC operation result using the replica bit cell block.

The readout circuit may be configured to read out the digital value of the MAC operation result by adjusting a state of at least a portion of the plurality of replica bit cells.

The plurality of source bit cells may be configured to determine resistance values indicating respective partial operation results, a composite resistance value of the source bit cell block may indicate the MAC operation result corresponding to a sum of the partial operation results, and the readout circuit may be configured to match a composite resistance value of the replica bit cell block to the composite resistance value of the source bit cell block by adjusting a resistance value of at least a portion of the plurality of replica bit cells.

2

The matched composite resistance value of the replica bit cell block may indicate the digital value of the MAC operation result.

The readout circuit may include a comparator configured to compare the source bit cell block and the replica bit cell block, and may be configured to adjust a state of at least a portion of the plurality of replica bit cells based on a comparison result of the comparator.

The replica bit cell block may be connected in series to the source bit cell block, and the comparator may be configured to compare a composite resistance value of the source bit cell block and a composite resistance value of the replica bit cell block based on a voltage applied to the source bit cell block.

The readout circuit may be configured to adjust a state of at least a portion of the plurality of replica bit cells using a binary search.

The readout circuit may be configured to: determine states of bit cells of a first group corresponding to ½ of the replica bit cell block based on a result of a comparison between the source bit cell block and the replica bit cell block in a first stage; and determine states of bit cells of a second group corresponding to ½ of the remaining ½ of the replica bit cell block based on a result of a comparison between the source bit cell block and the replica bit cell block in a second stage.

A first bit of the digital value of the MAC operation result may be determined corresponding to the states of the bit cells of the first group, and a second bit of the digital value of the MAC operation result may be determined corresponding to the states of the bit cells of the second group.

The replica bit cell block may include a plurality of sub-blocks corresponding to different reference resistance values, and the readout circuit may be configured to detect a sub-block corresponding to a composite resistance value of the source bit cell block among the plurality of sub-blocks and read out the digital value of the MAC operation result using the detected sub-block.

The MAC computation circuit may include: a plurality of source bit cell blocks including the source bit cell block; a plurality of replica bit cell blocks including the replica bit cell block; and a plurality of readout circuits including the readout circuit.

An electronic apparatus may include: the MAC computation circuit; and one or more processors configured to generate a recognition result of an input corresponding to the input signal, based on the digital value.

In another general aspect, a multiply-accumulate (MAC) computation circuit includes: a plurality of local source bit cell blocks configured to each perform a MAC operation on an input signal based on a plurality of source bit cells; a replica bit cell block comprising a plurality of replica bit cells corresponding to the plurality of source bit cells; and a readout circuit configured to read out digital values of individual MAC operation results of the plurality of local source bit cell blocks using the replica bit cell block.

The plurality of local source bit cell blocks may share the replica bit cell block and the readout circuit.

The readout circuit may be configured to sequentially read out the individual MAC operation results of the plurality of local source bit cell blocks.

The readout circuit may be configured to determine the digital values of the individual MAC operation results by adjusting a state of at least a portion of the plurality of replica bit cells.

The plurality of source bit cells may be configured to determine resistance values indicating respective partial operation results, a composite resistance value of the local source bit cell blocks may indicate the individual MAC operation results corresponding to a sum of the partial operation results, and the readout circuit may be configured to match a composite resistance value of the replica bit cell block to the composite resistance value of the local source bit cell blocks by adjusting a resistance value of at least a portion of the plurality of replica bit cells.

The readout circuit may include a comparator configured to compare the plurality of local source bit cell blocks and the replica bit cell block, and may be configured to adjust a state of at least a portion of the plurality of replica bit cells based on a comparison result of the comparator.

The replica bit cell block may be connected in series to a target bit cell block among the plurality of local source bit cell blocks, and the comparator may be configured to compare a composite resistance value of the target bit cell block and a composite resistance value of the replica bit cell block based on a voltage applied to the local source bit cell blocks.

The readout circuit may be configured to adjust a state of at least a portion of the plurality of replica bit cells using a binary search.

The plurality of local source bit cell blocks may include a first local source bit cell block configured to determine a first individual MAC operation result based on the input signal, the replica bit cell block may include a plurality of sub-blocks corresponding to different reference resistance values, and the readout circuit may be configured to detect a sub-block corresponding to a composite resistance value of the first local source bit cell block among the plurality of sub-blocks and read out a first digital value of the first individual MAC operation result using the detected sub-block.

In another general aspect, a multiply-accumulate (MAC) computation method includes: determining a multiply-accumulate (MAC) operation result of an input signal based on a plurality of source bit cells; and reading out a digital value of the MAC operation result using a replica bit cell block comprising a plurality of replica bit cells corresponding to the plurality of source bit cells.

In another general aspect, a multiply-accumulate (MAC) computation method includes: controlling a replica bit cell block by setting, for each of groups of the replica bit cell block, replica bit cells of the group to have either one of a first resistance value and a second resistance value, based on a composite resistance value of a source bit cell block; and reading out a digital value of a MAC operation result of the source bit cell block by comparing the composite resistance value of the source bit cell block and composite resistance values of the replica bit cell block generated by the controlling.

In a first stage, the controlling may include setting each of replica bit cells of a first group of the groups to have the first resistance value and each of replica bit cells of remaining groups of the groups to have the second resistance value, and the reading out may include determining a first bit of the digital value by comparing the composite resistance value of the source bit cell block and a composite resistance value of the replica bit cell block generated by the controlling in the first stage.

The determining of the first bit may include determining the first bit to be a first value in response to the composite resistance value of the source bit cell block being greater than or equal to the composite resistance value of the replica bit cell block generated by the controlling in the first stage.

The determining of the first bit may include determining the value of the first bit to be a second value in response to the composite resistance value of the source bit cell block being less than the composite resistance value of the replica bit cell block generated by the controlling in the first stage, and the first value may be greater than the second value.

The first bit may be a most significant bit (MSB) of the digital value.

A maximum value of the composite resistance value of the source bit cell block may be twice a maximum value of the composite resistance value of the replica bit cell block generated by the controlling in the first stage.

A number of the replica bit cells included in the first group may be twice a number of replica bit cells included in a second group of the groups.

In another general aspect, an electronic apparatus includes: a multiply-accumulate (MAC) computation circuit comprising: a source bit cell block configured to determine a MAC operation result of an input signal based on a plurality of source bit cells; a replica bit cell block comprising a plurality of replica bit cells corresponding to the plurality of source bit cells; and a readout circuit configured to read out a digital value of the MAC operation result using the replica bit cell block; and one or more processors configured to generate a recognition result of an input corresponding to the input signal, based on the digital value.

The recognition result may correspond to any one or any combination of any two or more of object classification, object recognition, speech recognition, and image recognition.

Other features and aspects will be apparent from the following detailed description, the drawings, and the claims.

Figure 1:
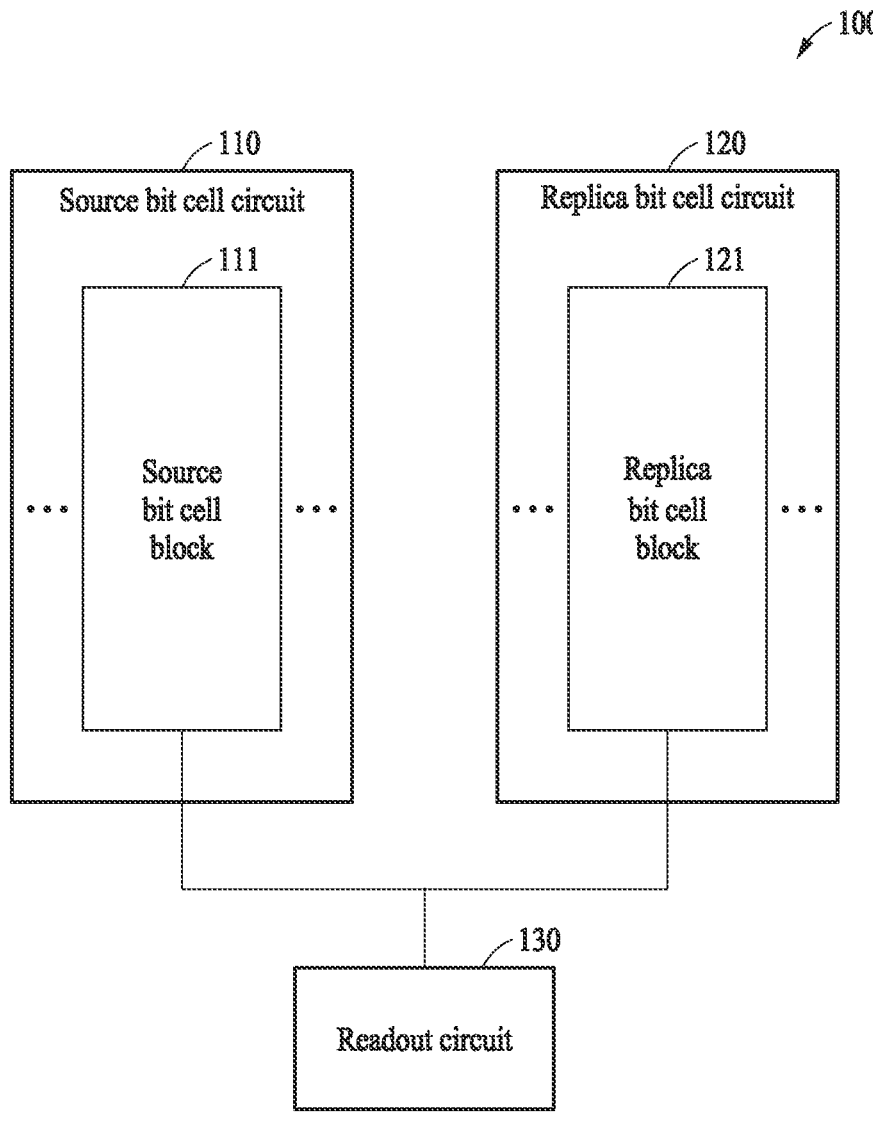
FIG. 1 illustrates an example of a configuration of a multiply-accumulate (MAC) computation circuit.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are used only to distinguish one member, component, region, layer, or section from another member, component, region, layer, or section. For example, a "first" member, component, region, layer, or section referred to in examples described herein may also be referred to as a "second" member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the examples. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of a configuration of a multiply-accumulate (MAC) computation circuit. Referring to FIG. 1, a MAC computation circuit 100 may include a source bit cell circuit 110 and a replica bit cell circuit 120. The source bit cell circuit 110 may include a source bit cell block 111, and the replica bit cell circuit 120 may include a replica bit cell block 121. The source bit cell block 111 may determine a MAC operation result of an input signal, and a readout circuit 130 may read out a digital value of the MAC operation result using the replica bit cell block 121.

Each of the source bit cell block 111 and the replica bit cell block 121 may include a plurality of bit cells. A bit cell of the source bit cell block 111 may be referred to as a "source bit cell" and a bit cell of the replica bit cell block 121 may be referred to as a "replica bit cell". Bit cells may perform a memory function of storing a weight, and a function of performing a MAC operation between an input value and a weight value. A bit cell may include a resistance device and/or a memory device. For example, the bit cell may correspond to a resistive memory device. A bit cell array 290 of FIG. 2 may correspond to a memory array, because the bit cell array 290 has a memory function of storing a weight value. Also, the bit cell array 290 may correspond to an accelerator, because the bit cell array 290 performs an operation function specialized for a MAC operation.

The source bit cell circuit 110 may include a plurality of source bit cells in the form of an array. Each row of the array may form an input line, and each column of the array may form an output line. The source bit cell block 111 may correspond to a column of the array. Each of source bit cells of the source bit cell block 111 may store a weight value, and may determine a resistance value indicating a multiplication result obtained by multiplying an input value and a weight value in response to an input signal. The multiplication result may correspond to a partial operation result of a MAC operation. For example, the input value may be determined based on a voltage value of the input signal, and the weight value may be determined based on a resistor arrangement of a source bit cell. When a resistance value based on the resistor arrangement of the source bit cell is determined based on the voltage value of the input signal, the resistance value may indicate a multiplication result obtained by multiplying an input value and a weight value, and the above multiplication results may be accumulated, to represent a MAC operation result. In an example, source bit cells may be connected in series to each other, and a composite resistance value of the source bit cells may indicate a MAC operation result.

The readout circuit 130 may determine a composite resistance value of the source bit cell block 111 using the replica bit cell block 121, and may read out a digital value of a MAC operation result based on the composite resistance value. Depending on various examples, the readout circuit 130 may read out the digital value of the MAC operation result. In an example, the replica bit cell block 121 may have a corresponding structure of the source bit cell block 111, and the readout circuit 130 may match a composite resistance value of the replica bit cell block 121 to the composite resistance value of the source bit cell block 111 by adjusting a resistance value of at least a portion of replica bit cells of the replica bit cell block 121. For example, the readout circuit 130 may control the replica bit cell block 121 based on a binary search. The matched composite resistance value of the replica bit cell block 121 may represent the digital value of the MAC operation result. In another example, the replica bit cell block 121 may include a plurality of sub-blocks corresponding to different reference resistance values, and the readout circuit 130 may read out the digital value using a sub-block corresponding to the composite resistance value of the source bit cell block 111 among the plurality of sub-blocks.

The source bit cell circuit 110 may include a plurality of source bit cell blocks. For example, when the source bit cell circuit 110 includes an m×n bit cell array, a number of source bit cell blocks may be "m". In this example, the replica bit cell circuit 120 may include the same number of replica bit cell blocks as a number (for example, "m") of the plurality of source bit cell blocks. Also, each of the source bit cell blocks may have a dedicated replica bit cell block. In another example, the replica bit cell circuit 120 may include a number of replica bit cell blocks less than the number of the plurality of source bit cell blocks. In this example, "m/k" source bit cell blocks may share one replica bit cell block.

Through a readout scheme using the replica bit cell circuit 120, the MAC computation circuit 100 of one or more embodiments may reduce a number of peripheral circuits for readout in the MAC computation circuit 100, and may increase a proportion of bit cells. For example, a peripheral circuit may include a write/read driver, a level shifter, a timing generator, an amplifier, or an analog-to-digital converter (ADC). As a proportion of bit cells increases, a memory device region and other device regions in the MAC computation circuit 100 of one or more embodiments may be balanced. When an area of a peripheral circuit decreases, a power efficiency and an area of the MAC computation circuit 100 of one or more embodiments may increase.

Figure 2:
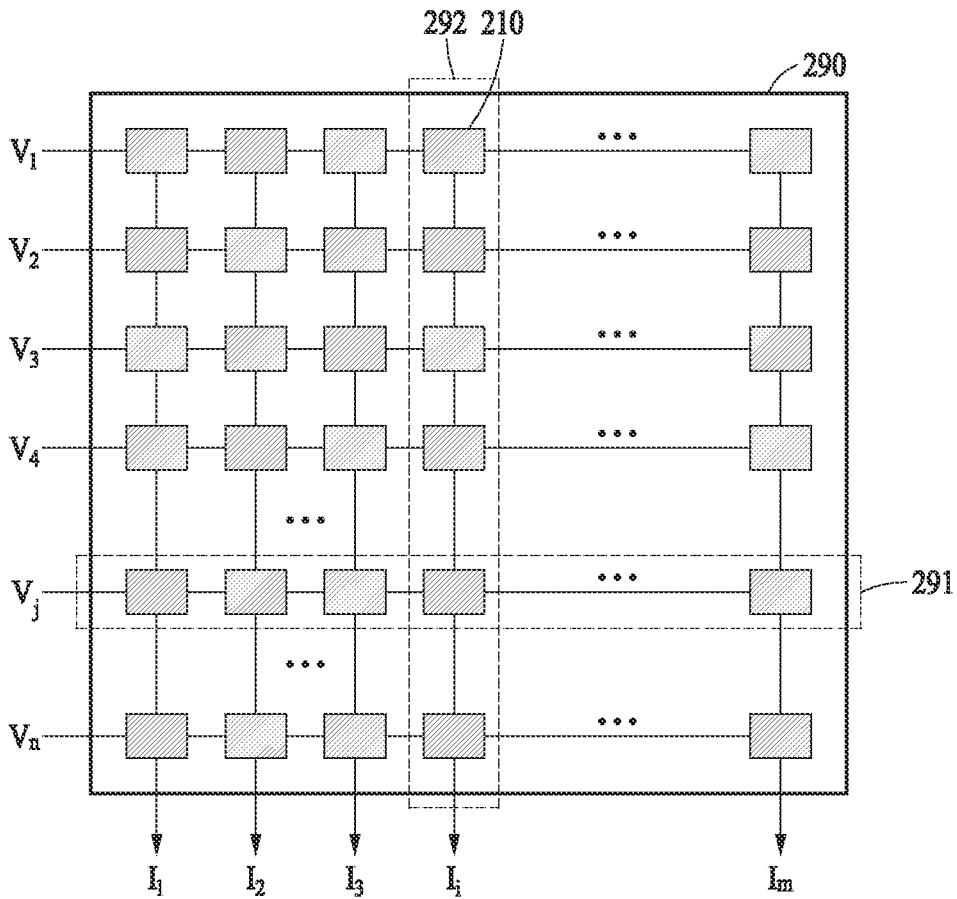
FIG. 2 illustrates an example of a structure of a bit cell array.

FIG. 2 illustrates an example of a structure of a bit cell array. Referring to FIG. 2, the bit cell array 290 may include a plurality of input lines that may individually receive input signals, and a plurality of output lines that may individually generate output signals. In an example, the source bit cell circuit 110 of FIG. 1 may include the bit cell array 290, and the source bit cell block 111 may be one column of the bit cell array 290. Input signals may be input through input voltages $V_1$ to $V_n$, and output signals may be output through output currents $I_1$ to $I_m$.

Each of the plurality of output lines may include a plurality of bit cells. Each of the plurality of input lines may intersect the plurality of output lines. The input lines and the output lines intersect perpendicular to each other as shown in FIG. 2, however, examples are not limited thereto. For example, the bit cell array 290 may include "n" input lines and "m" output lines. A plurality of bit cells may be arranged along the plurality of output lines and the plurality of input lines. For example, the plurality of bit cells may be arranged for each of the plurality of input lines along an output line. Each of the plurality of bit cells may be configured to receive a voltage through an input line in which each of the bit cells is arranged among the plurality of input lines. For example, bit cells arranged along a j-th input line 291 may receive an input voltage $V_j$ as an input signal. The input voltages $V_1$ to $V_n$ may have voltage values indicating binary values. For example, an input voltage signal indicating a bit value of "1" may represent a set voltage, and an input voltage signal indicating a bit value of "0" may represent a floating voltage.

In an example, an i-th analog output $I_i$ of an i-th output line 292 may correspond to a result of a MAC operation performed between values of the voltages $V_1$ to $V_n$ applied to the i-th output line 292 by the input signals and resistance values of bit cells (e.g., including a bit cell 210) belonging to the i-th output line 292. For example, the values of the voltages $V_1$ to $V_n$ applied to the i-th output line 292 may correspond to input values, and a weight value may be determined based on a resistor arrangement of a bit cell. When a resistance value based on the resistor arrangement of the bit cell is determined based on the values of the voltages $V_1$ to $V_n$, the resistance value may indicate a multiplication result obtained by multiplying an input value and a weight value. The above multiplication results may be accumulated along the i-th output line 292 to represent a MAC operation result of the i-th output line 292. In an example, the source bit cells may be connected in series to each other, and a composite resistance value of the bit cells of the i-th output line 292 may indicate the MAC operation result of the i-th output line 292.

Figure 3:
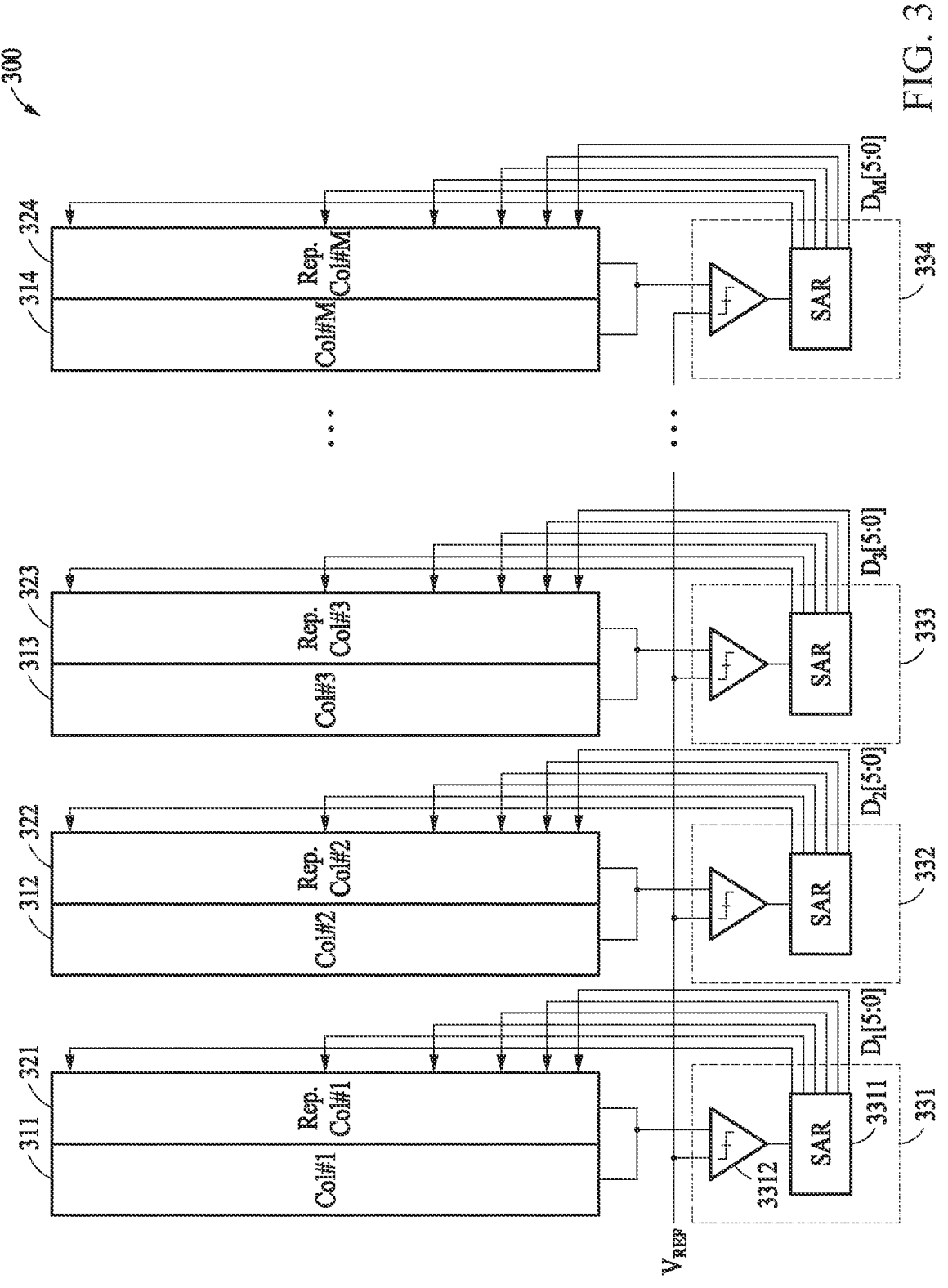
FIG. 3 illustrates an example of a structure of a MAC computation circuit based on column pairs.

FIG. 3 illustrates an example of a structure of a MAC computation circuit based on column pairs. Referring to FIG. 3, a MAC computation circuit 300 may include a first column pair of a first source bit cell block 311 and a first replica bit cell block 321, a second column pair of a second source bit cell block 312 and a second replica bit cell block 322, a third column pair of a third source bit cell block 313 and a third replica bit cell block 323, and an N-th column pair of an N-th source bit cell block 314 and an N-th replica bit cell block 324. Column pairs may correspond to a first column to an N-th column. Since the first replica bit cell block 321 to the N-th replica bit cell block 324 may be respectively mapped to the first source bit cell block 311 to the N-th source bit cell block 314, each of the first source bit cell block 311 to the N-th source bit cell block 314 may have a dedicated replica bit cell block. However, examples are not limited thereto, and another non-limiting example may include a structure in which a plurality of source bit cell blocks share one replica bit cell block, which will be further described below with reference to FIG. 8.

A first readout circuit 331 may include a first successive approximation register (SAR) logic 3311 and a first comparator 3312. The first SAR logic 3311 may adjust states of replica bit cells of the first replica bit cell block 321 based on the first source bit cell block 311. For example, the first SAR logic 3311 may adjust the states of the replica bit cells to mimic or match a composite resistance value of the first source bit cell block 311. The adjusting of the states may include adjusting a resistance value of a bit cell of the replica bit cells. For example, when a resistance value of the bit cell is determined based on an input value, the first SAR logic 3311 may adjust the resistance value of the bit cell by adjusting the input value of the bit cell. The first comparator 3312 may compare the first source bit cell block 311 and the first replica bit cell block 321. The first SAR logic 3311 may adjust the states of the replica bit cells based on a result of the comparing (i.e., a comparison result), and an adjustment result may represent a digital value $D_1[5:0]$ of a MAC operation result of the first source bit cell block 311 (e.g., the adjustment result may be a digital value that corresponds to the MAC operation result of the first source bit cell block 311).

Each of the remaining readout circuits 332 to 334 may include a SAR logic and a comparator, and may read out digital values $D_2[5:0]$ to $D_N[5:0]$ of MAC operation results of the second source bit cell block 312 to the N-th source bit cell block 314 by adjusting the second replica bit cell block 321 to the N-th replica bit cell block 324, respectively. Although a 6-bit digital value is shown in FIG. 3, the digital value may have other bit precisions (e.g., a bit precision less than 6-bit or more than 6-bit).

Figure 4:
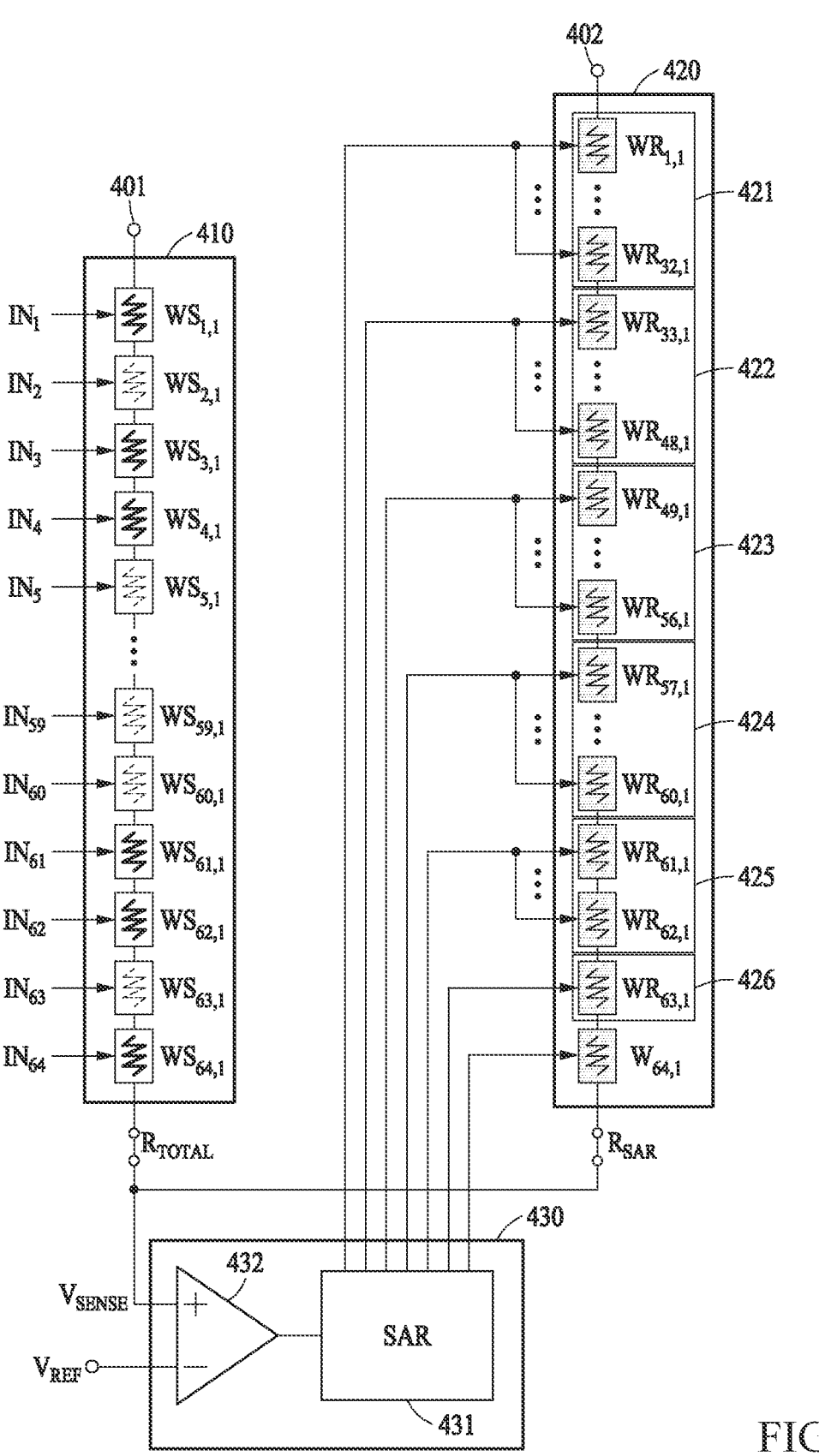
FIG. 4 illustrates an example of a structure of a column pair.

FIG. 4 illustrates an example of a structure of a column pair. Referring to FIG. 4, a source bit cell block 410 may include a plurality of source bit cells. A source bit cell may be denoted by $WS_{i,j}$ in which j denotes a row index and i denotes a column index. FIG. 4 shows "64" rows, and a number of rows may be set to values other than "64". An input signal $IN_j$ may be applied to the source bit cell $WS_{i,j}$. The source bit cell $WS_{i,j}$ may have a resistor arrangement corresponding to a weight value. In other words, the resistor arrangement of the source bit cell $WS_{i,j}$ may be determined based on a weight value of the source bit cell $WS_{i,j}$. The source bit cell $WS_{i,j}$ may determine a partial operation result (for example, a multiplication result) based on the input signal $IN_j$ and the resistor arrangement. The partial operation result may be determined based on a resistance value of the source bit cell $WS_{i,j}$. Multiplication results of source bit cells $WS_{i,j}$ of the same output line may be accumulated to indicate a MAC operation result of the output line. The MAC operation result may be indicated by a composite resistance value.

Figure 5:
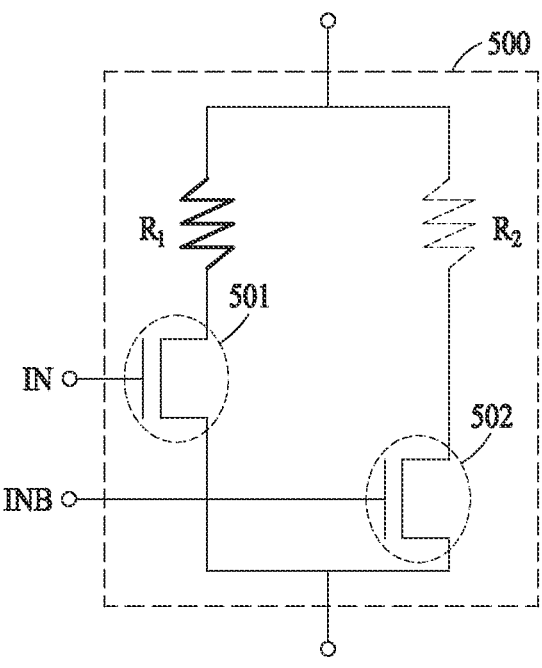
FIG. 5 illustrates an example of a structure of a bit cell.

FIG. 5 illustrates an example of a structure of a bit cell. Referring to FIG. 5, a bit cell 500 may include a first resistor $R_1$, a second resistor $R_2$, and transistors 501 and 502. A resistor arrangement of the first resistor $R_1$ and the second resistor $R_2$ may be determined based on a weight value to be recorded or stored in the bit cell 500. In an example of a first weight value, a first resistor arrangement in which a first resistance value is assigned to the first resistor $R_1$ and in which a second resistance value is assigned to the second resistor $R_2$ may be applied. For example, in FIG. 5, a bold line of the first resistor $R_1$ may indicate the first resistance value, a dashed line of the second resistor $R_2$ may indicate the second resistance value. The first resistance value may be significantly greater than the second resistance value. The first resistance value and the second resistance value may be represented by $R_H$ and $R_L$, respectively. In an example of a second weight value, a second resistor arrangement in which a second resistance value is assigned to the first resistor $R_1$ and in which a first resistance value is assigned to the second resistor $R_2$ may be applied. For example, in FIG. 5, a bold line of the first resistor $R_1$ may indicate the second resistance value, a dashed line of the second resistor $R_2$ may indicate the first resistance value. In an example, a magnetic tunnel junction may be used for the first resistor $R_1$ and the second resistor $R_2$, and the bit cell 500 may correspond to a magnetic random access memory (MRAM).

One of the first resistor $R_1$ and the second resistor $R_2$ may be selected based on a first input signal IN and a second input signal INB. The first input signal IN and the second input signal INB may have opposite values. For example, when the first input signal IN has a value of "1" and the second input signal INB has a value of "0", the first resistor $R_1$ may be selected through the transistors 501 and 502. Further, when the first input signal IN has a value of "0" and the second input signal INB has a value of "1", the second resistor $R_2$ may be selected through the transistors 501 and 502. In this example, a resistance value of the bit cell 500 may be determined based on the resistor arrangement of the first resistor $R_1$ and the second resistor $R_2$. Thus, the bit cell 500 may perform an operation using an input signal and a resistor arrangement. For example, the bit cell 500 may perform an XNOR operation as shown in a truth table of Table 1 below.

TABLE 1

| IN(INB) | $R_1(R_2)$ | Selected resistor | Resistance value | XNOR result |
|---|---|---|---|---|
| 0(1) | 0(1) | $R_2$ | $R_H$ | 1 |
| 0(1) | 1(0) | $R_2$ | $R_L$ | 0 |
| 1(0) | 0(1) | $R_1$ | $R_L$ | 0 |
| 1(0) | 1(0) | $R_1$ | $R_H$ | 1 |

Referring back to FIG. 4, the replica bit cell block 420 may include a plurality of replica bit cells. A replica bit cell may be denoted by $WR_{i,j}$. When the source bit cell block 410 determines or outputs a composite resistance value $R_{TOTAL}$ of the source bit cell block 410 indicating a MAC operation result (based on input signals $IN_1$ to $IN_{64}$ and source bit cells $WS_{1,1}$ to $WS_{64,1}$), the readout circuit 430 may mimic or match the composite resistance value $R_{TOTAL}$ of the source bit cell block 410 using the replica bit cell block 420. The readout circuit 430 may match a composite resistance value $R_{SAR}$ of the replica bit cell block 420 to the composite resistance value $R_{TOTAL}$ of the source bit cell block 410 by controlling states of replica bit cells $WR_{1,1}$ to $WR_{64,1}$, and may read out a digital value of a MAC operation result in the above process.

Figure 6:
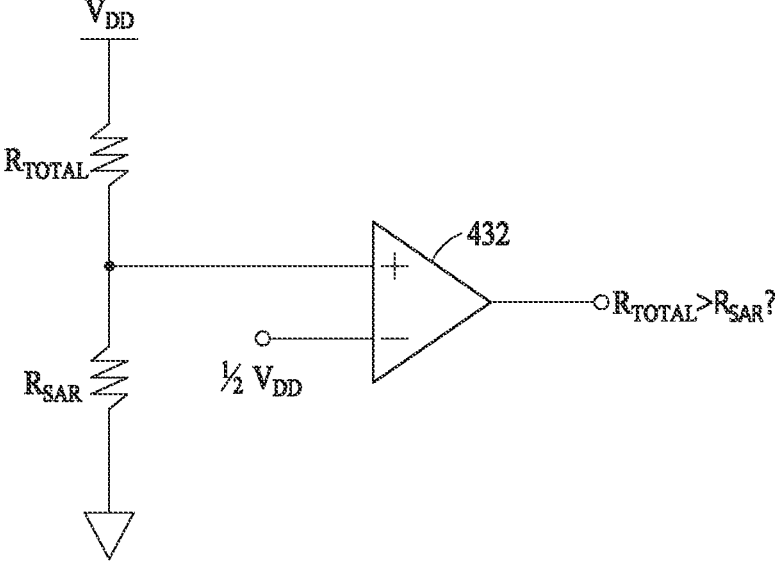
FIG. 6 illustrates an example of a comparison operation of a comparator.

The readout circuit 430 may control the states of the replica bit cells $WR_{1,1}$ to $WR_{64,1}$ using a SAR logic 431, and may determine a digital value of a MAC operation result based on a comparison result of a comparator 432. When a driving voltage $V_{DD}$ is supplied to a first node 401, the driving voltage $V_{DD}$ may be distributed to the source bit cell block 410 and the replica bit cell block 420 according to a ratio between the composite resistance value $R_{TOTAL}$ and the composite resistance value $R_{SAR}$, such that a sensing voltage $V_{SENSE}$ may be determined. The readout circuit 430 may use a binary search. For example, as shown in FIG. 6, a reference voltage $V_{REF}$ may be set to ½ of the driving voltage $V_{DD}$. For example, when the driving voltage $V_{DD}$ is 1 V, the reference voltage $V_{REF}$ may be set to 0.5 V. A voltage of the second node 402 may be set to 0 V. The replica bit cell block 420 may be connected in series to the source bit cell block 410, and the comparator 432 may compare the composite resistance value $R_{TOTAL}$ and the composite resistance value $R_{SAR}$ based on the sensing voltage $V_{SENSE}$ and the reference voltage $V_{REF}$.

As shown in FIG. 4, the replica bit cells $WR_{1,1}$ to $WR_{64,1}$ may be classified into groups 421 to 426, and each bit of a digital value may be determined corresponding to a state of each of the groups 421 to 426. For example, a first bit (i.e., a most significant bit (MSB) of the digital value) may be determined based on a state of a first group 421 including replica bit cells $WR_{1,1}$ to $WR_{32,1}$. A second bit, a third bit, a fourth bit, a fifth bit, and a sixth bit of the digital value may be determined based on a state of a second group 422, a state of a third group 423, a state of a fourth group 424, a state of a fifth group 425, and a state of a sixth group 426, respectively. Although an example of "64" rows and a 6-bit digital value is shown in FIG. 4, the number of rows and a number of bits may also have values other than "64" and "6". The number of rows may depend on the number of bits of the digital value. For example, to obtain a p-bit precision, "$2^p$" rows may be used.

FIGS. 7A to 7E illustrate examples of stages of reading out a digital value of a MAC operation result. Referring to FIGS. 7A to 7E, each resistance value of source bit cells $W_{1,1}$ to $W_{64,1}$ of a source bit cell block 710 may be determined based on input signals $IN_1$ to $IN_{64}$. A composite resistance value $R_{TOTAL}$ may correspond to resistance values of the source bit cells $W_{1,1}$ to $W_{64,1}$. For example, the source bit cells $W_{1,1}$ to $W_{64,1}$ may be connected in series, and the composite resistance value $R_{TOTAL}$ may correspond to a sum of the resistance values of the source bit cells $W_{1,1}$ to $W_{64,1}$. A readout circuit 730 may control states of replica bit cells $W_{1,1}$ to $W_{64,1}$ of a replica bit cell block 720 using a SAR logic 731, and may determine a digital value of a MAC operation result based on a comparison result of a comparator 732. For example, in a p-th stage, a p-th bit of the digital value may be determined.

Figure 7A:
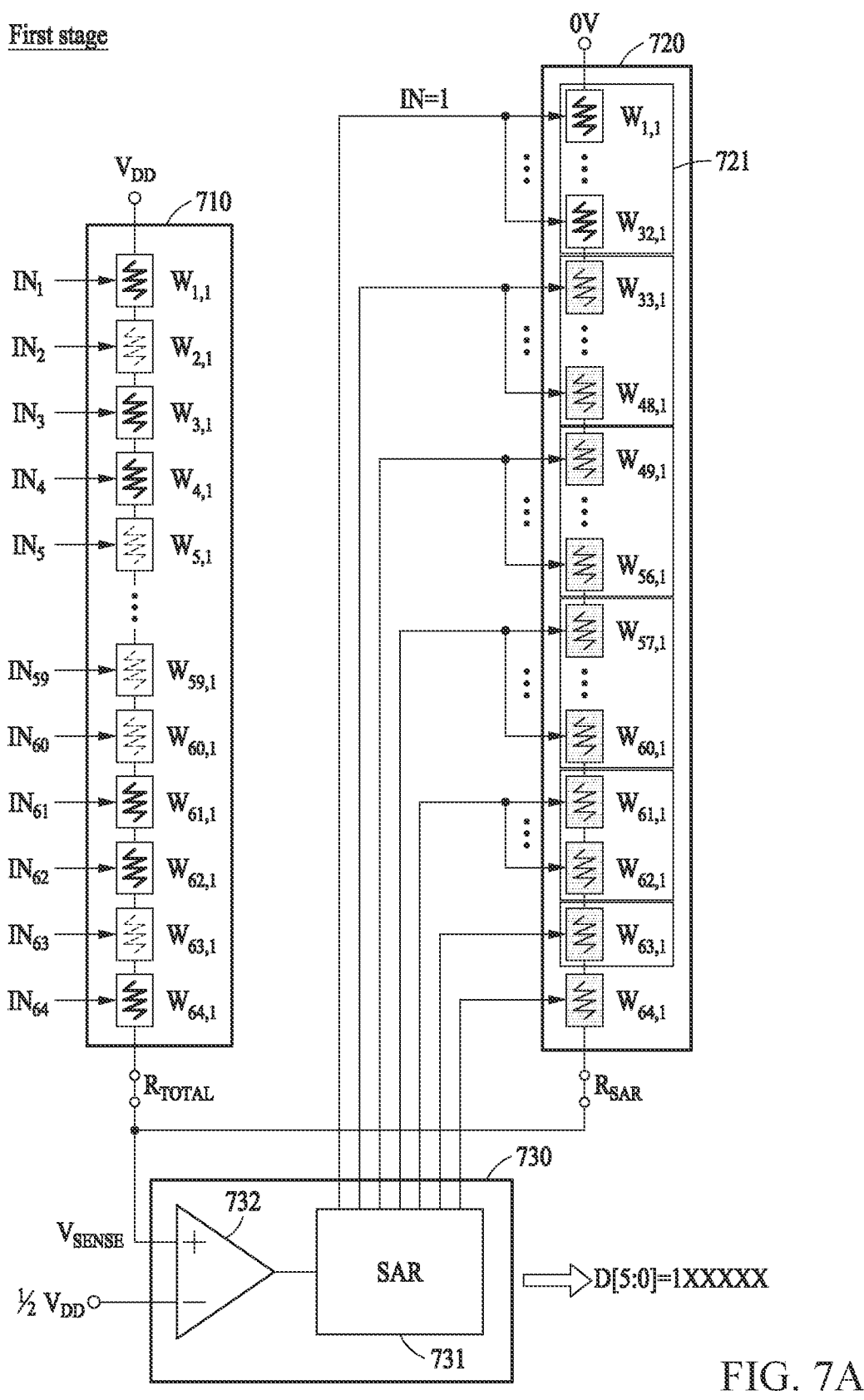
FIGS. 7A to 7E illustrate examples of stages of reading out a digital value of a MAC operation result.

FIG. 7A illustrates a first stage. In FIG. 7A, the SAR logic 731 may control replica bit cells $W_{1,1}$ to $W_{32,1}$ of a first group 721 to represent a first resistance value $R_H$. For example, an input signal to select a resistor having the first resistance value $R_H$ may be applied (e.g., by the SAR logic 731) to the replica bit cells $W_{1,1}$ to $W_{32,1}$. In an example, when the replica bit cells $W_{1,1}$ to $W_{32,1}$ have the structure of FIG. 5, a first resistor arrangement in which the first resistance value $R_H$ is assigned to a first resistor $R_1$ and in which a second resistance value $R_L$ is assigned to a second resistor $R_2$ may be applied to the replica bit cells $W_{1,1}$ to $W_{32,1}$, and an input signal IN of "1" may be applied to the replica bit cells $W_{1,1}$ to $W_{32,1}$. The remaining replica bit cells $W_{33,1}$ to $W_{64,1}$ may be controlled to have the second resistance value $R_L$. For example, an input signal to select a resistor having the second resistance value $R_L$ may be applied to the replica bit cells $W_{33,1}$ to $W_{64,1}$. The readout circuit 730 may set a composite resistance value $R_{SAR}$ to be an intermediate value of resistance values of all the replica bit cells $W_{1,1}$ to $W_{64,1}$ of a current stage, and may perform a binary search based on the intermediate value.

Figure 7B:
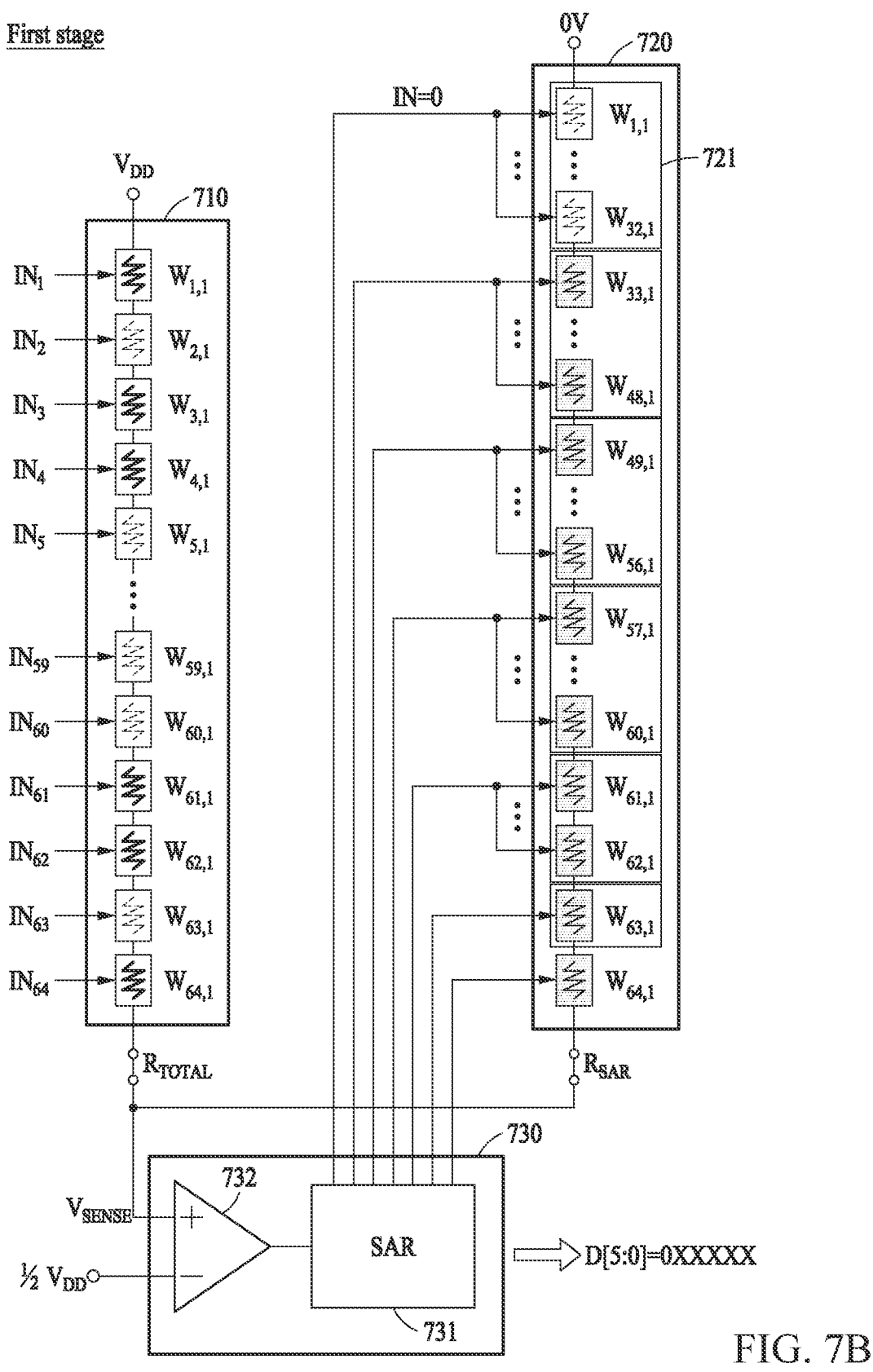

The comparator 732 may compare a sensing voltage $V_{SENSE}$ and a reference voltage $V_{REF}$. In an example, when the sensing voltage $V_{SENSE}$ is greater than the reference voltage $V_{REF}$, a state of the first group 721 may be maintained in a state in which the first resistance value $R_H$ is represented, and a first bit of a digital value D[5:0] may be determined to be "1". In another example, when the sensing voltage $V_{SENSE}$ is less than the reference voltage $V_{REF}$, the state of the first group 721 may be adjusted to a state in which the second resistance value $R_L$ is represented as shown in FIG. 7B. For example, an input signal IN of "0" may be applied to the replica bit cells $W_{1,1}$ to $W_{32,1}$. In this example, the first bit of the digital value D[5:0] may be determined to be "0". When the first resistor arrangement is applied to the replica bit cells $W_{1,1}$ to $W_{32,1}$, each bit of the digital value D[5:0] may be determined to correspond to the input signal IN. In the following description, the first bit may be assumed to be "1". In addition, an initial value of the input signal IN may be assumed to be "1", however, the initial value may also be "0". In this example, states of the replica bit cells $W_{1,1}$ to $W_{32,1}$ may be adjusted from the second resistance value $R_L$ to the first resistance value $R_H$.

Figure 7C:
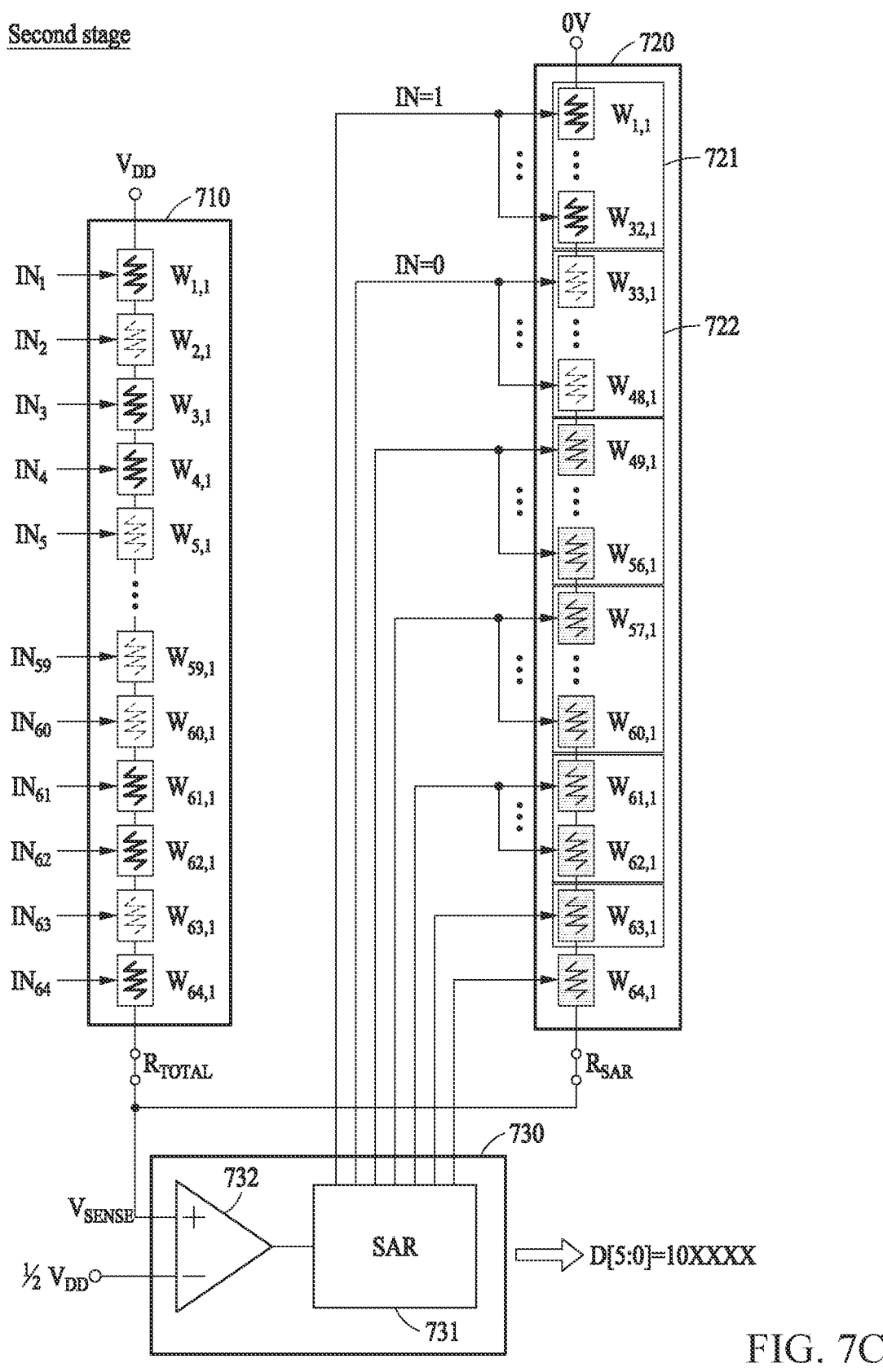

Similar operations may also be performed in next stages. For example, in a second stage of FIG. 7C, the readout circuit 730 may adjust a state of a second group 722, and may compare the sensing voltage $V_{SENSE}$ and the reference voltage $V_{REF}$. The input signal IN of "0" may be applied to replica bit cells $W_{33,1}$ to $W_{48,1}$ of the second group 722, and the input signal IN of "0" may be applied to the remaining replica bit cells $W_{49,1}$ to $W_{64,1}$, and accordingly the composite resistance value $R_{SAR}$ may be set to be an intermediate value of resistance values of all the replica bit cells $W_{33,1}$ to $W_{64,1}$ of a current stage. In an example, when the sensing voltage $V_{SENSE}$ is greater than the reference voltage $V_{REF}$, a resistance value of the second group 722 may be determined to be the first resistance value $R_H$. In another example, when the sensing voltage $V_{SENSE}$ is less than the reference voltage $V_{REF}$, the state of the second group 722 may be adjusted to a state indicating the second resistance value $R_L$, for example, a state in which the input signal IN of "0" is applied, and the resistance value of the second group 722 may be determined to be the second resistance value $R_L$. In FIG. 7C, a second bit may be "0".

Figure 7D:
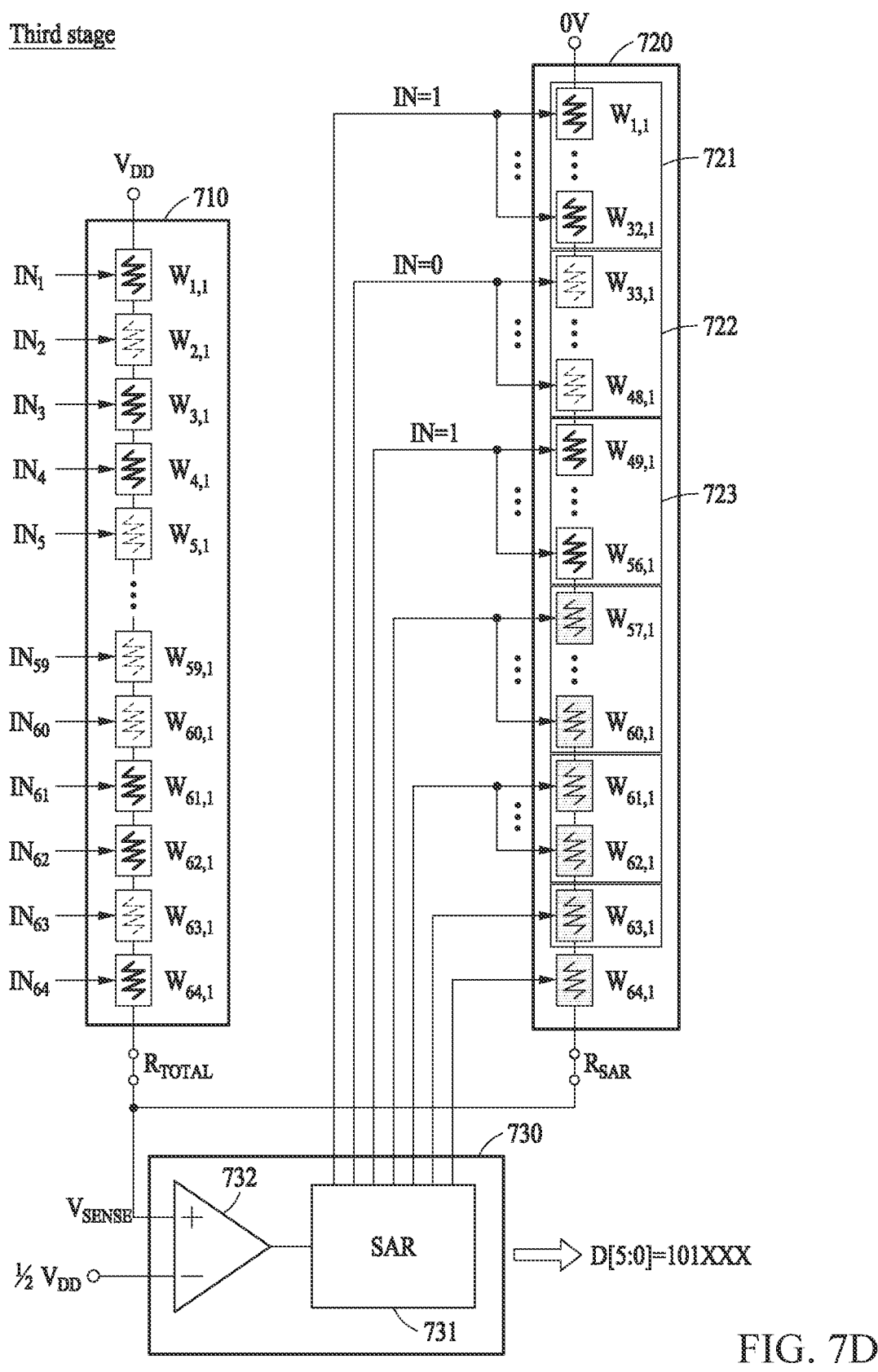
Figure 7E:
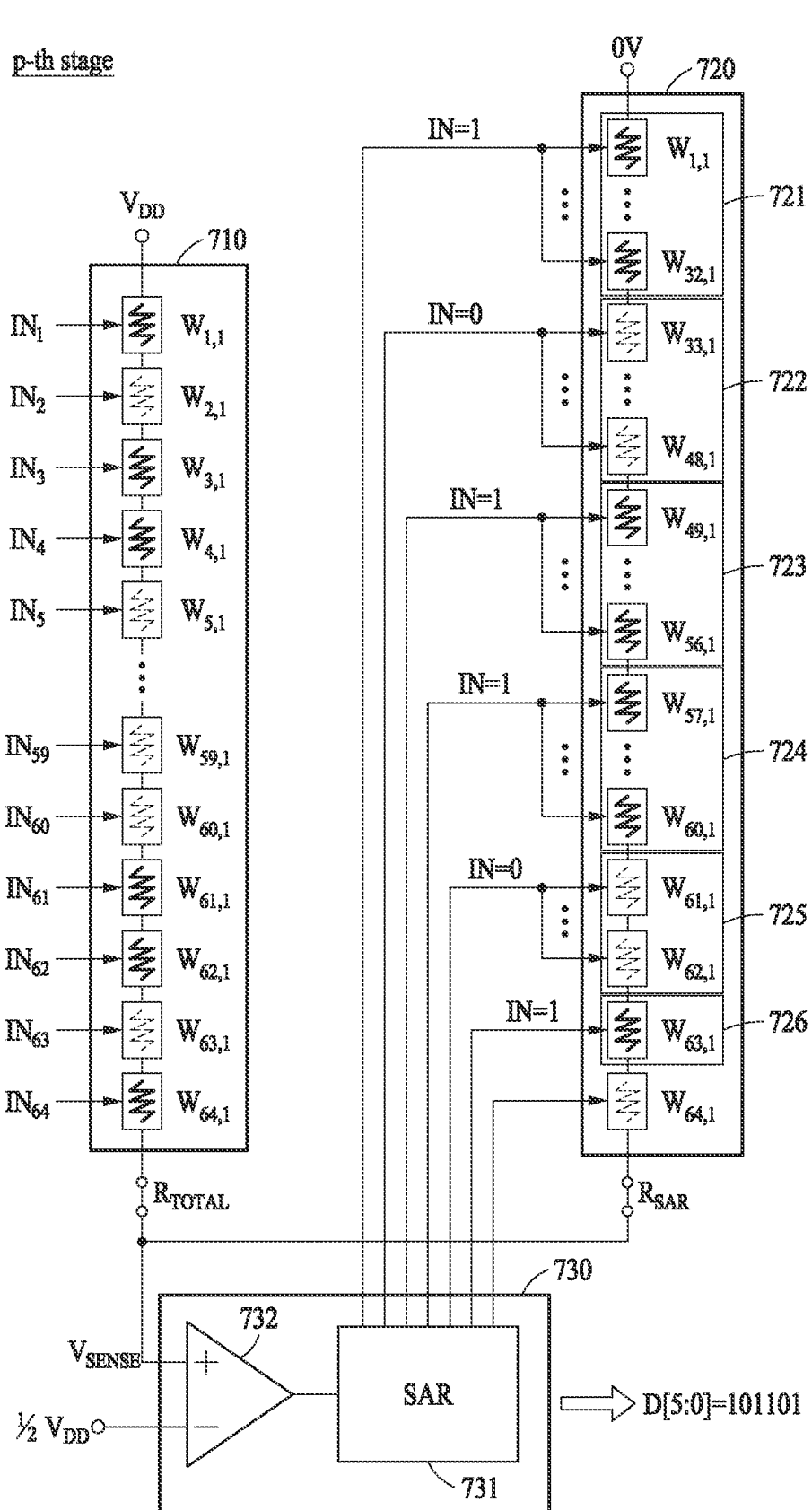

In a third stage of FIG. 7D, a third bit of the digital value D[5:0] may be determined to be "1" by adjusting a state of a third group 723. A fourth bit to a p-th bit of the digital value D[5:0] may be determined by adjusting a state of each of a fourth group 724 to a p-th group 726, up to a p-th stage of FIG. 7E. Although p is set to "6" as shown in FIG. 7E, p may have values other than "6". In an example, when the p-th stage ends, the digital value D[5:0] may be read out as "101101".

Figure 8:
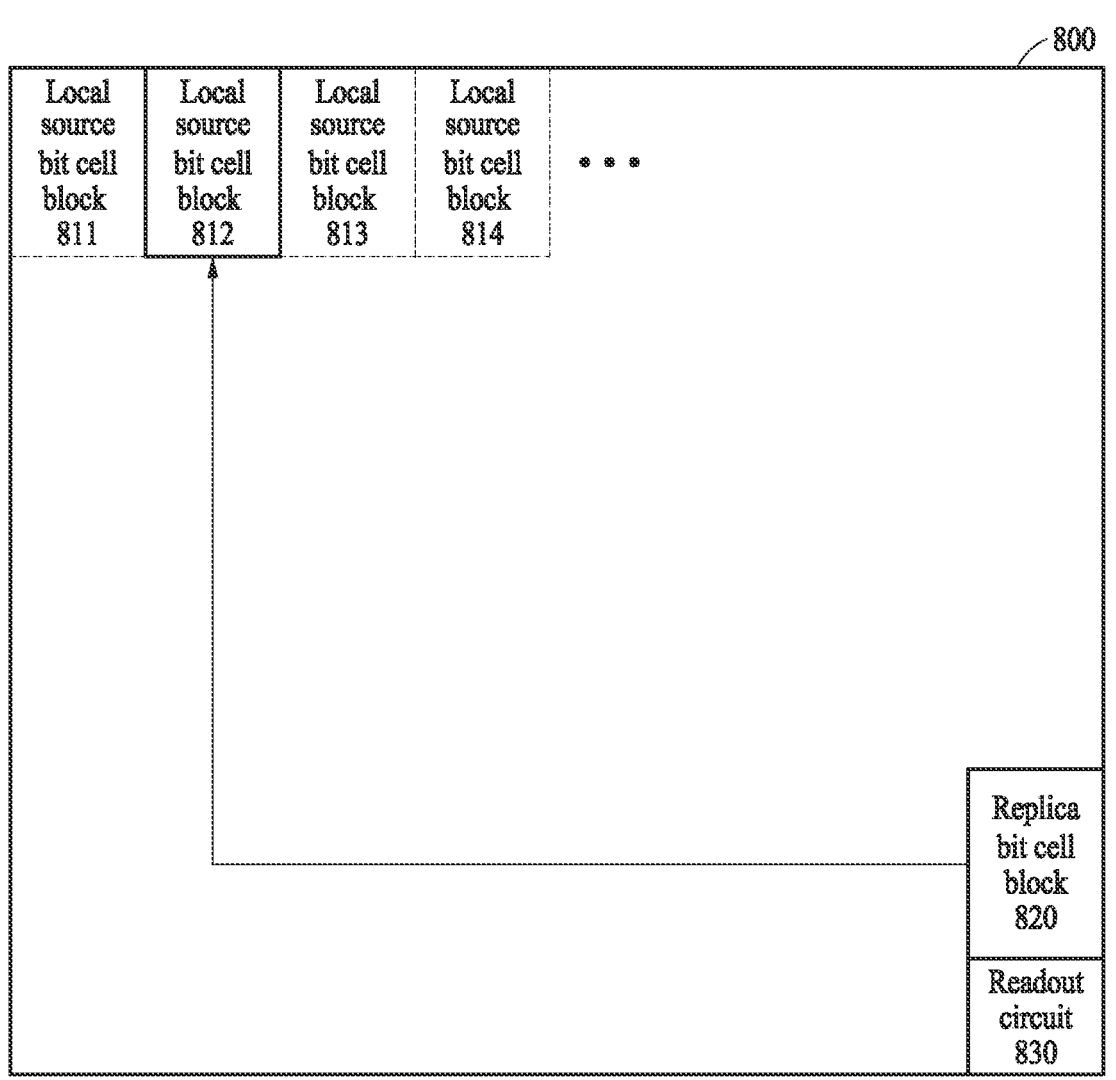
FIG. 8 illustrates an example of a structure of a local-global sharing-based MAC computation circuit.

FIG. 8 illustrates an example of a structure of a local-global sharing-based MAC computation circuit. Referring to FIG. 8, a MAC computation circuit 800 may include a plurality of local source bit cell blocks 811 to 814, a replica bit cell block 820, and a readout circuit 830. Each of the plurality of local source bit cell blocks 811 to 814 may perform a MAC operation on an input signal based on a plurality of source bit cells. The replica bit cell block 820 may include a plurality of replica bit cells corresponding to the plurality of source bit cells. The readout circuit 830 may read out digital values of individual MAC operation results of the local source bit cell blocks 811 to 814 using the replica bit cell block 820.

The local source bit cell blocks 811 to 814 may share the replica bit cell block 820 and the readout circuit 830. One replica bit cell block 820 and one readout circuit 830 may be used to read out digital bits of the plurality of local source bit cell blocks 811 to 814. The replica bit cell block 820 and the readout circuit 830 may sequentially read out the digital values of the individual MAC operation results of the local source bit cell blocks 811 to 814. For example, the readout circuit 830 may select a target bit cell block (for example, a second local source bit cell block 812) among the local source bit cell blocks 811 to 814, and may read out a MAC operation result of the target bit cell block using the replica bit cell block 820.

Depending on various examples, the readout circuit 830 may read out a digital value of a MAC operation result. In an example, the replica bit cell block 820 may have a corresponding structure of the local source bit cell blocks 811 to 814, and the readout circuit 830 may read out the digital value by adjusting the replica bit cell block 820 to mimic or match a composite resistance value of the target bit cell block among the local source bit cell blocks 811 to 814. In this example, the description of FIGS. 3 to 7 may apply to the above readout operation. In another example, the replica bit cell block 820 may include a plurality of sub-blocks corresponding to different reference resistance values, and the readout circuit 830 may read out the digital value using a sub-block corresponding to a composite resistance value of a target bit cell among the plurality of sub-blocks, which will be further described below with reference to FIG. 9. In addition, the above description of FIGS. 1 to 7 and description of FIGS. 9 to 13 that will be provided below may apply to the MAC computation circuit 800.

Figure 9:
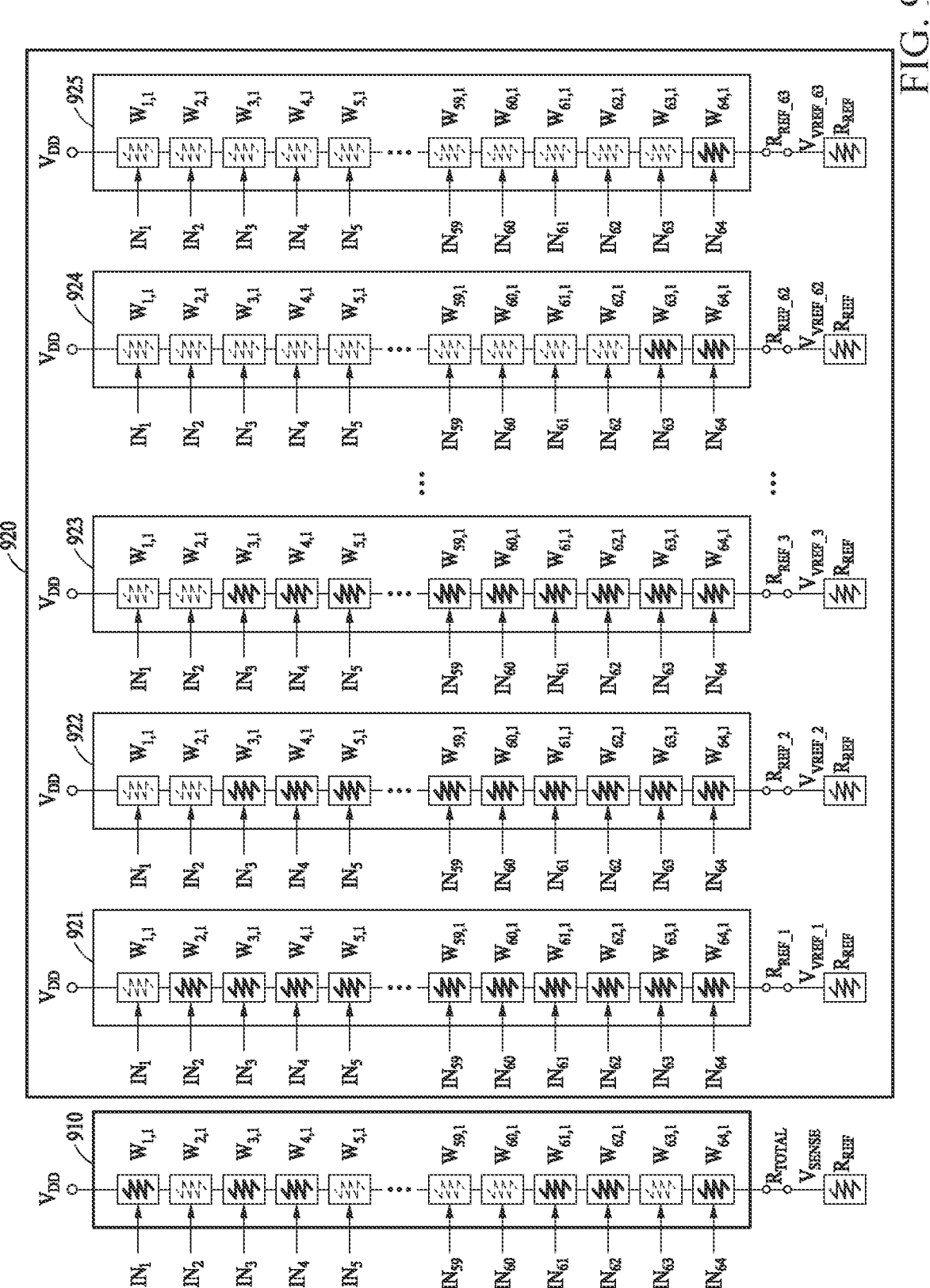
FIG. 9 illustrates an example of a readout structure using sub-blocks of a replica bit cell block.

FIG. 9 illustrates an example of a readout structure using sub-blocks of a replica bit cell block. Referring to FIG. 9, a replica bit cell block 920 may include a plurality of sub-blocks 921 to 925. The sub-blocks 921 to 925 may respectively correspond to different reference resistance values.

For example, a first sub-block 921 may have a first reference resistance value $R_{REF\_1}$, a second sub-block 922 may have a second reference resistance value $R_{REF\_2}$, and a 63rd sub-block 925 may have a 63rd reference resistance value $R_{REF\_63}$.

Each of the reference resistance values $R_{REF\_1}$ to $R_{REF\_63}$ may indicate a composite resistance value of each of the sub-blocks 921 to 925. The reference resistance values $R_{REF\_1}$ to $R_{REF\_63}$ may be determined based on input signals $IN_1$ to $IN_{64}$. For example, an input signal $IN_1$ of "1" may be applied to a first bit cell $W_{1,1}$, and an input signal $IN_0$ of "0" may be applied to the other bit cells $W_{2,1}$ to $W_{64,1}$, so that the first reference resistance value $R_{REF\_1}$ may be induced. To read out a p-bit digital value, the replica bit cell block 920 may include "2^p–1" sub-blocks. Although an example in which p is set to "6" is shown in FIG. 9, p may have values other than "6".

A source bit cell block 910 may perform a MAC operation based on the input signals $IN_1$ to $IN_{64}$, and a MAC operation result may be reflected to a composite resistance value $R_{TOTAL}$. A driving voltage $V_{DD}$ may be distributed to the source bit cell block 910 based on the composite resistance value $R_{TOTAL}$ and a reference resistance value $R_{REF}$, and a sensing voltage $V_{SENSE}$ may represent a voltage distributed to the source bit cell block 910. Also, reference voltages $V_{REF\_1}$ to $V_{REF\_63}$ based on the reference resistance values $R_{REF\_1}$ to $R_{REF\_63}$ may be applied to the sub-blocks 921 to 925.

A readout circuit may detect a sub-block corresponding to the composite resistance value $R_{TOTAL}$ of the source bit cell block 910 among the sub-blocks 921 to 925 and may read out a digital value of the MAC operation result using the detected sub-block. The readout circuit may compare the sensing voltage $V_{SENSE}$ and the reference voltages $V_{REF\_1}$ to $V_{REF\_63}$ using a comparator, and may determine the digital value of the MAC operation result based on a comparison result. For example, different digital values may be assigned to the sub-blocks 921 to 925 based on the reference resistance values $R_{REF}$ to $R_{REF\_63}$ and/or the reference voltages $V_{REF\_1}$ to $V_{REF\_63}$, and the readout circuit may determine the digital value of the MAC operation result based on a digital value of the detected sub-block according to the comparison result.

In an example, the readout structure of FIG. 9 may be applied to the structure of the MAC computation circuit 800 of FIG. 8. The replica bit cell block 820 of FIG. 8 may include the sub-blocks 921 to 925 corresponding to different reference resistance values, and the readout circuit 830 may compare the sensing voltage $V_{SENSE}$ and the reference voltages $V_{REF\_1}$ to $V_{REF\_63}$ and may read out digital values of individual MAC operation results of the local source bit cell blocks 811 to 814. For example, when the first local source bit cell block 811 determines a first individual MAC operation result based on an input signal, the readout circuit 830 may detect a sub-block corresponding to a composite resistance value of the first local source bit cell block 811 among the sub-blocks 921 to 925, and may read out a digital value of the first individual MAC operation result using the detected sub-block. In addition, the above description of FIGS. 1 to 8 and description of FIGS. 10 to 13 that will be provided below may apply to a MAC computation circuit 900 of FIG. 9.

Figure 10:
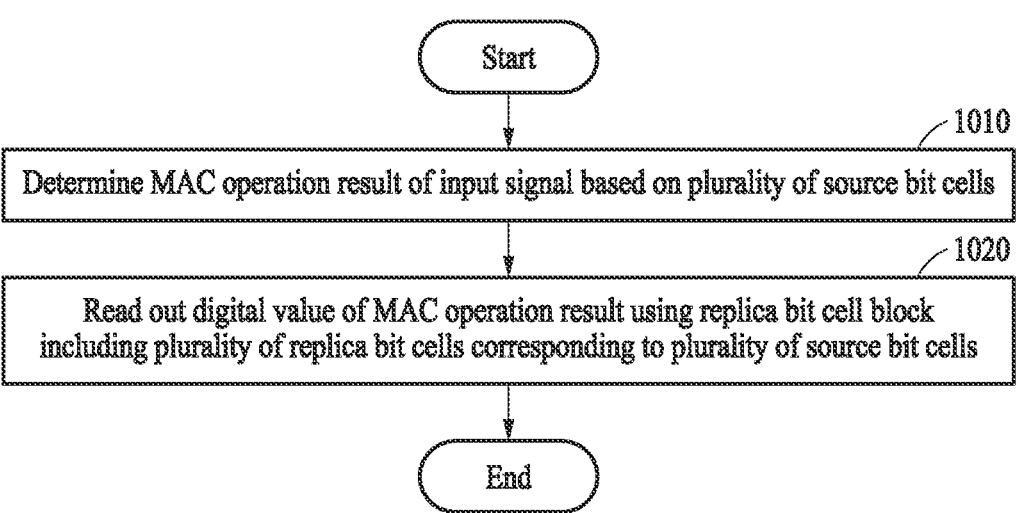
FIG. 10 illustrates an example of a computing operation.

FIG. 10 illustrates an example of a computing operation. Referring to FIG. 10, in operation 1010, a MAC computation circuit may determine a MAC operation result of an input signal based on a plurality of source bit cells. The plurality of source bit cells may determine a resistance value indicating each partial operation result (for example, a multiplication result) based on the input signal, and a composite resistance value of a source bit cell block may indicate a MAC operation result corresponding to a sum of partial operation results. The MAC computation circuit may match a composite resistance value of a replica bit cell block to the composite resistance value of the source bit cell block by adjusting a resistance value of at least a portion of a plurality of replica bit cells. For example, the MAC computation circuit may adjust resistance values for each group for a binary search. In this example, the matched composite resistance value of the replica bit cell block may represent a digital value of the MAC operation result.

In operation 1020, the MAC computation circuit may read out the digital value of the MAC operation result using the replica bit cell block that includes the plurality of replica bit cells corresponding to the plurality of source bit cells.

In an example, the MAC computation circuit may read out the digital value of the MAC operation result by adjusting a state of at least a portion of the plurality of replica bit cells. The MAC computation circuit may adjust a state of at least a portion of the plurality of replica bit cells based on a comparison result of a comparator that compares the source bit cell block and the replica bit cell block. For example, the replica bit cell block may be connected in series to the source bit cell block, and the comparator may compare the composite resistance value of the source bit cell block and the composite resistance value of the replica bit cell block based on a voltage applied to the source bit cell block.

The MAC computation circuit may adjust a state of at least a portion of the replica bit cells using a binary search. For example, the MAC computation circuit may determine states of bit cells of a first group corresponding to ½ of the replica bit cell block based on a result of a comparison between the source bit cell block and the replica bit cell block in a first stage, and may determine states of bit cells of a second group corresponding to ½ of the remaining ½ of the replica bit cell block based on a result of a comparison between the source bit cell block and the replica bit cell block in a second stage. In this example, a first bit of the digital value of the MAC operation result may be determined corresponding to the states of the bit cells of the first group, and a second bit of the digital value of the MAC operation result may be determined corresponding to the states of the bit cells of the second group.

In another example, the MAC computation circuit may read out the digital value of the MAC operation result using a plurality of sub-blocks of the replica bit cell block. The replica bit cell block may include the plurality of sub-blocks corresponding to different reference resistance values, and the MAC computation circuit may detect a sub-block corresponding to the composite resistance value of the source bit cell block among the plurality of sub-blocks, and may read out the digital value of the MAC operation result using the detected sub-block.

Figure 11:
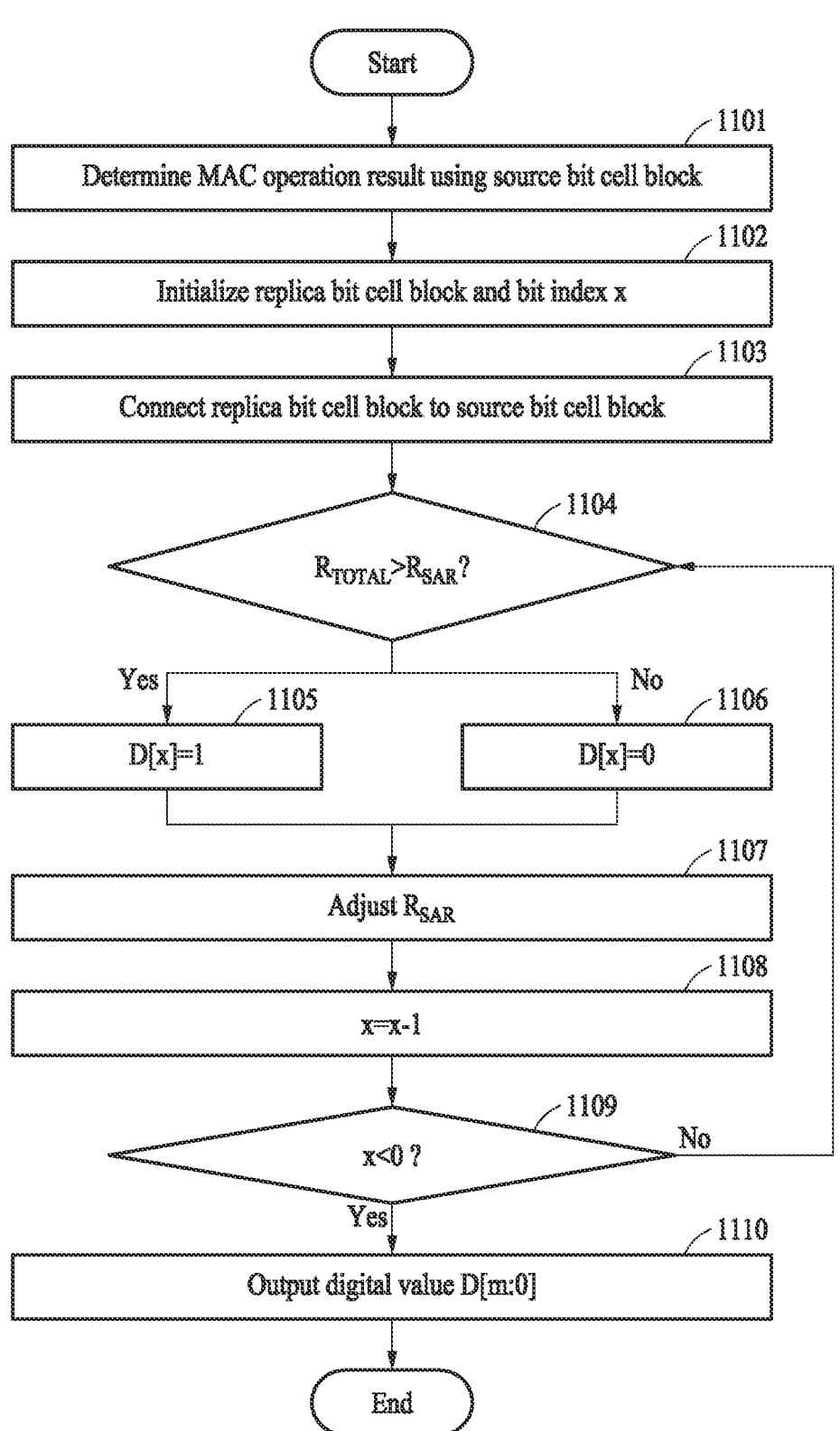
FIG. 11 illustrates an example of a state adjustment-based readout operation.

FIG. 11 illustrates an example of a state adjustment-based readout operation. Referring to FIG. 11 in operation 1101, a MAC computation circuit may determine a MAC operation result using a source bit cell block. The MAC computation circuit may apply an input signal to the source bit cell block, and the MAC operation result may be determined based on a partial operation between an input value of the input signal and a weight value of each source bit cell. The MAC operation result may be reflected to a composite resistance value of the source bit cell block.

In operation 1102, the MAC computation circuit may initialize a replica bit cell block and a bit index x. A replica bit cell may have a resistor arrangement corresponding to a weight value and may represent a resistance value corresponding to an operation result in response to the input signal. Replica bit cells may be initialized to a predetermined resistor arrangement, and the MAC computation circuit may determine a resistance value of a replica bit cell based on the input signal. For example, when a replica bit cell has the structure shown in FIG. 5, the replica bit cell may be initialized to a first resistor arrangement in which a first resistance value $R_H$ is assigned to a first resistor $R_1$ and in which a second resistance value $R_L$ is assigned to a second resistor $R_2$. In this example, the MAC computation circuit may allow the replica bit cell to have the first resistance value $R_H$ in response to an input signal of "1", and may allow the replica bit cell to have the second resistance value $R_L$ in response to an input signal of "0". The bit index x may be initialized based on a target bit precision. For example, when the target bit precision is a p-bit precision (for example, a 6-bit precision), the bit index x may be initialized to "p−1" (for example, x of "5").

In operation 1103, the MAC computation circuit may connect the replica bit cell block to the source bit cell block. For example, the replica bit cell block and the source bit cell block may be connected in series. The MAC computation circuit may apply driving voltages to both ends of each of the source bit cell block and the replica bit cell block. The driving voltages may be distributed to the source bit cell block and the replica bit cell block according to a composite resistance of the source bit-cell block and a composite resistance of the replica bit-cell block. Hereinafter, the composite resistance of the source bit-cell block and the composite resistance of the replica bit-cell block may be referred to as a "source composite resistance" and a "replica composite resistance", respectively.

In operation 1104, the MAC computation circuit may compare a source composite resistance $R_{TOTAL}$ and a replica composite resistance $R_{SAR}$. The MAC computation circuit may search for the source composite resistance $R_{TOTAL}$ through a binary search. Although an example in which the binary search is used to search for the source composite resistance $R_{TOTAL}$ will be described below, other various schemes of searching for the source composite resistance $R_{TOTAL}$ may be used. In a first stage, the MAC computation circuit may allow replica bit cells of a first group corresponding to ½ of the replica bit cell block to have the first resistance value $R_H$, and allow replica bit cells corresponding to the remaining ½ of the replica bit cell block to have the second resistance value $R_L$.

The MAC computation circuit may compare the source composite resistance $R_{TOTAL}$ and the replica composite resistance $R_{SAR}$, based on a voltage applied to the source bit cell block and a voltage applied to the replica bit cell block. The MAC computation circuit may use a comparator configured to compare a sensing voltage to a reference voltage. For example, the sensing voltage may be a voltage applied to the source bit cell block among the driving voltages, and the reference voltage may be ½ of the sensing voltage. Based on the above configuration, when the source composite resistance $R_{TOTAL}$ is greater than the replica composite resistance $R_{SAR}$, the sensing voltage may be set to be greater than the reference voltage. Thus, the source composite resistance $R_{TOTAL}$ and the replica composite resistance $R_{SAR}$ may be compared based on the sensing voltage and the reference voltage.

The MAC computation circuit may determine the states of the bit cells of the first group based on a result of a comparison between the source bit cell block and the replica bit cell block in the first stage. Also, the MAC computation circuit may determine a first bit of a digital value of the MAC operation result based on the states of the bit cells of the first group. In an example, when the source composite resistance $R_{TOTAL}$ is greater than the replica composite resistance $R_{SAR}$, the first resistance value $R_H$ may be determined as a resistance value of the first group. In this example, the MAC computation circuit may determine a bit value D[x] of the first stage to be "1" in operation 1105. For example, x may be set to "5", and D[5] may correspond to an MSB. In another example, when the source composite resistance $R_{TOTAL}$ is less than the replica composite resistance $R_{SAR}$, the second resistance value $R_L$ may be determined as a resistance value of the first group. In this example, the MAC computation circuit may determine a current bit value D[x] to be "0" in operation 1106.

The MAC computation circuit may determine states of bit cells of a second group corresponding to ½ of the remaining bit cells obtained by excluding the first group from the replica bit cell block in a second stage. The states of the bit cells of the second group may be used to determine a second bit of the digital value of the MAC operation result. In operation 1107, the MAC computation circuit may adjust the replica composite resistance $R_{SAR}$. The MAC computation circuit may allow replica bit cells corresponding to ½ of the second group to have the first resistance value $R_H$ and allow replica bit cells corresponding to the remaining ½ to have the second resistance value $R_L$. The MAC computation circuit may reduce a value of the bit index x by "1", and operation 1104 may be reperformed. A value of the second bit may be determined based on the comparison result of operation 1140. The above operations may be repeated until the value of the bit index x becomes zero. When the value of the bit index x is determined to be less than zero in operation 1109, the MAC computation circuit may output a digital value D[m:0] in operation 1110.

Figure 12:
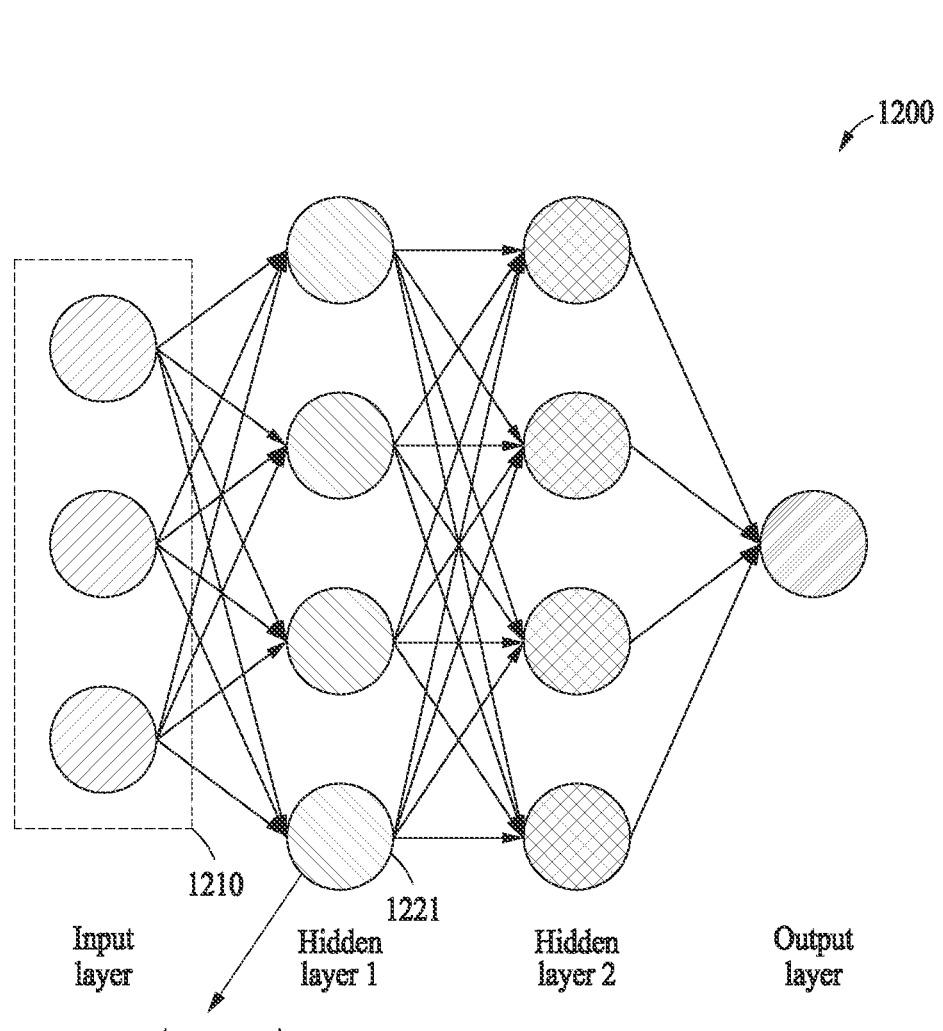
FIG. 12 illustrates an example of a neural network operation that may be implemented by a MAC computation circuit.

FIG. 12 illustrates an example of a neural network operation that may be implemented by a MAC computation circuit. A neural network 1200 may correspond to an example of a deep neural network (DNN). The DNN may include, for example, a fully connected network, a deep convolutional network, and/or a recurrent neural network. The neural network 1200 may map input data and output data that are in a nonlinear relationship based on deep learning, to perform, for example, object classification, object recognition, speech recognition, and/or image recognition. Deep learning, which is a machine learning scheme used to solve an issue such as image or speech recognition from a big data set, may map input data and output data to each other through supervised or unsupervised learning.

Although a hidden layer includes two layers as shown in FIG. 12 for convenience of description, various numbers of layers may be included in the hidden layer. Also, although the neural network 1200 includes a separate input layer 1210 to receive input data as shown in FIG. 12, the input data may be input directly to the hidden layer. In the neural network 1200, artificial nodes of layers other than an output layer may be connected to artificial nodes of a next layer through links for transmitting output signals. A number of links may correspond to a number of artificial nodes included in the next layer.

To each artificial node included in the hidden layer, outputs of artificial nodes included in a previous layer may be input in a weighted form. Such an input in the weighted form may be called a "weighted input" and may be obtained by multiplying a respective weight by outputs of artificial nodes included in the previous layer. A weight may also be referred to as a parameter of the neural network 1200. An activation function may be applied to a sum of weighted inputs, to be output to a next layer. The activation function may include, for example, sigmoid, hyperbolic tangent (tan h), or rectified linear unit (ReLU). By the activation function, nonlinearity of the neural network 1200 may be formed. To each artificial node included in the output layer, weighted inputs of outputs of artificial nodes included in a previous layer may be input.

For in-memory computing for driving a deep learning algorithm, the MAC computation circuits 100, 300, and 800 described above with reference to FIGS. 1 to 11 may be used. For example, calculation of a weight input transferred between nodes 1221 of the neural network 1200 may include a MAC operation that repeats a multiplication and an addition. An output of one node 1221 of the neural network 1200 may be represented as shown in the following equation:

$$ y_i = f\left( \sum_{j=1}^{m} w_{j,i} x_j \right) $$

The equation may represent an output value y, of an i-th node 1221 for "m" weighted input values in one layer. $x_j$ denotes a j-th output value (for example, a node value) of a previous layer, and $w_{j,i}$ denotes a weight applied to the j-th output value of the previous layer and the i-th node 1221. Also, $w_{j,i} x_j$ denotes a j-th weighted input among the "m" weighted input values in the i-th node 1221 of the corresponding layer, and f( ) denotes an activation function. As shown in the above equation, for the activation function, a multiplication and accumulation result of the node value $x_j$ and the weight $w_{j,i}$ may be used. In other words, a memory access operation that requires loading of an appropriate node value $x_j$ and weight $w_{j,i}$ at a desired time, and a MAC operation of multiplying and adding the node value $x_j$ and weight $w_{j,i}$ may be repeated.

In an example, bit cells of a MAC computation circuit may have a resistance corresponding to a connection weight of a connection line used to connect a plurality of nodes in the neural network 1200 that includes a layer including the plurality of nodes. An input voltage signal provided along input lines on which a plurality of bit cells are arranged may represent a value corresponding to the node value $x_j$. Thus, the MAC computation circuit may perform at least a portion of operations required for execution of the neural network 1200. In the MAC computation circuit, resistance values of the bit cells may not be fixed, and may also be changed to a resistance value corresponding to a weight value stored in a memory as described above.

However, an application of the MAC computation circuit is not limited thereto, and the MAC computation circuit may also be utilized for a computation operation that requires fast processing of a plurality of pieces of input data with low power using analog circuit characteristics.

Figure 13:
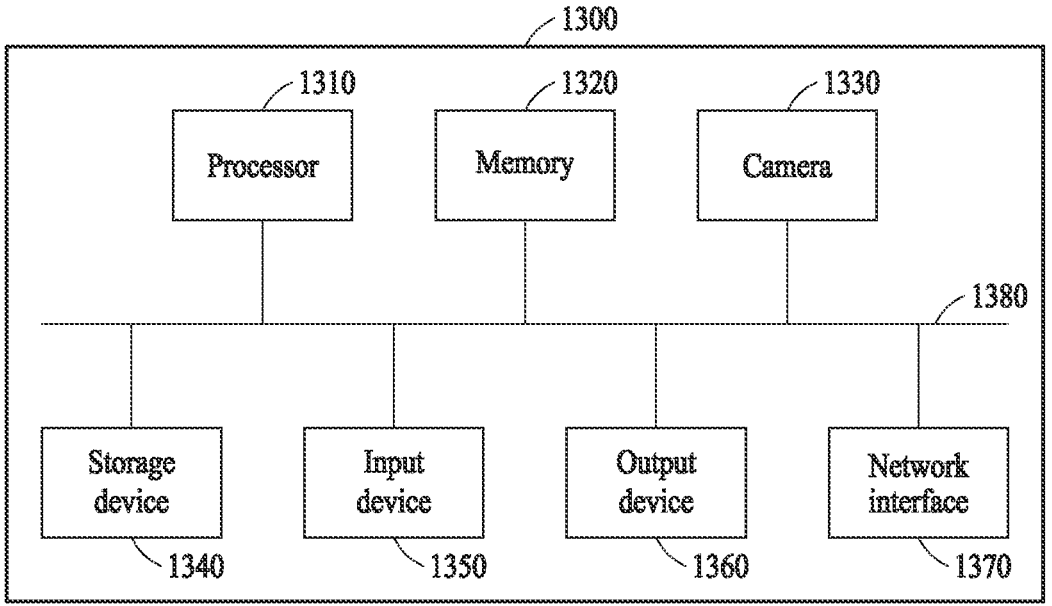
FIG. 13 illustrates an example of an electronic apparatus.

FIG. 13 illustrates an example of an electronic apparatus. Referring to FIG. 13, an electronic apparatus 1300 may include a processor 1310 (e.g., one or more processors), a memory 1320 (e.g., one or more memories), a camera 1330, a storage device 1340, an input device 1350, an output device 1360, and a network interface 1370. The processor 1310, the memory 1320, the camera 1330, the storage device 1340, the input device 1350, the output device 1360, and the network interface 1370 may communicate with each other via a communication bus 1380. For example, the electronic apparatus 1300 may be implemented as at least a portion of, for example, a mobile device such as a mobile phone, a smartphone, a personal digital assistant (PDA), a netbook, a tablet computer or a laptop computer, a wearable device such as a smartwatch, a smart band or smart glasses, a computing device such as a desktop or a server, home appliances such as a television (TV), a smart TV or a refrigerator, a security device such as a door lock, or a vehicle such as an autonomous vehicle or a smart vehicle. The electronic apparatus 1300 may structurally and/or functionally include the MAC computation circuits 100, 300, and 800. For example, the MAC computation circuits 100, 300, and 800 may be implemented as a portion of the processor 1310 and/or the memory 1320, or as a portion of an accelerator of the electronic apparatus 1300.

The processor 1310 may execute instructions and functions in the electronic apparatus 1300. For example, the processor 1310 may process instructions stored in the memory 1320 or the storage device 1340. The processor 1310 may perform the operations described above with reference to FIGS. 1 through 12. For example, the processor 1310 may include one or more processors such as any one or more of a microprocessor, a central processing unit (CPU), a processor core, a multi-core processor, a multiprocessor, an application-specific integrated circuit (ASIC), and/or a field-programmable gate array (FPGA). In an example, the one or more processors may generate a recognition result corresponding to any one or more of object classification, object recognition, speech recognition, and image recognition based on a digital value of a MAC operation result read out by the MAC computation circuit. The memory 1320 may include a non-transitory computer-readable storage medium or a non-transitory computer-readable storage device. The memory 1320 may store instructions that are to be executed by the processor 1310, and may also store information associated with software and/or applications when the software and/or applications are being executed by the electronic apparatus 1300.

The camera 1330 may capture a photo and/or a video. The storage device 1340 may include a non-transitory computer-readable storage medium or a non-transitory computer-readable storage device. In an example, the storage device 1340 may store a greater amount of information than that of the memory 1320 for a relatively long period of time. For example, the storage device 1340 may include magnetic hard disks, optical disks, flash memories, floppy disks, or other forms of non-volatile memories known in the art.

The input device 1350 may receive an input from a user through a traditional input scheme using a keyboard and a mouse, and through a new input scheme such as a touch input, a voice input and an image input. The input device 1350 may include, for example, a keyboard, a mouse, a touch screen, a microphone, or other devices configured to detect an input from a user and transmit the detected input to the electronic apparatus 1300. The output device 1360 may provide a user with an output of the electronic apparatus 1300 through a visual channel, an auditory channel, or a tactile channel. The output device 1360 may include, for example, a display, a touchscreen, a speaker, a vibration generator, or any other device configured to provide a user with the output. The network interface 1370 may communicate with an external device via a wired or wireless network.

The MAC computation circuits, source bit cell circuits, source bit cell blocks, replica bit cell circuits, replica bit cell blocks, readout circuits, bit cells, bit cell arrays, j-th input lines, i-th output lines, first source bit cell blocks, first replica bit cell blocks, second source bit cell blocks, second replica bit cell blocks, third source bit cell blocks, third replica bit cell blocks, N-th source bit cell blocks, N-th replica bit cell blocks, first readout circuits, first SAR logics, first comparators, second readout circuits, third readout circuits, fourth readout circuits, first nodes, second nodes, groups, SAR logics, comparators, transistors, first to p-th groups, local source bit cell blocks, sub-blocks, electronic apparatuses, processors, memories, cameras, storage devices, input devices, output devices, network interfaces, communication buses, MAC computation circuit 100, source bit cell circuit 110, source bit cell block 111, replica bit cell circuit 120, replica bit cell block 121, readout circuit 130, bit cell 210, bit cell array 290, j-th input line 291, i-th output line 292, MAC computation circuit 300, first source bit cell block 311, first replica bit cell block 321, second source bit cell block 312, second replica bit cell block 322, third source bit cell block 313, third replica bit cell block 323, N-th source bit cell block 314, N-th replica bit cell block 324, first readout circuit 331, first SAR logic 3311, first comparator 3312, second readout circuit 332, third readout circuit 333, fourth readout circuit 334, first node 401, second node 402, source bit cell block 410, replica bit cell block 420, groups 421 to 426, readout circuit 430, SAR logic 431, comparator 432, bit cell 500, transistors 501 and 502, source bit cell block 710, replica bit cell block 720, first group 721, readout circuit 730, SAR logic 731, comparator 732, second group 722, third group 723, fourth group 724 to a p-th group 726, MAC computation circuit 800, local source bit cell blocks 811 to 814, replica bit cell block 820, readout circuit 830, source bit cell block 910, replica bit cell block 920, sub-blocks 921 to 925, electronic apparatus 1300, processor 1310, memory 1320, camera 1330, storage device 1340, input device 1350, output device 1360, network interface 1370, communication bus 1380, and other apparatuses, devices, units, modules, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A multiply-accumulate (MAC) computation circuit comprising:
   a source bit cell block configured to determine a MAC operation result of an input signal based on a plurality of source bit cells;
   a replica bit cell block comprising a plurality of replica bit cells corresponding to the plurality of source bit cells; and
   a readout circuit configured to receive the MAC operation result, adjust a state of at least a portion of the plurality of replica bit cells based on the MAC operation result, and read out a digital value of the MAC operation result using the replica bit cell block.

2. The MAC computation circuit of claim 1, wherein the plurality of source bit cells are configured to determine resistance values indicating respective partial operation results,
   a composite resistance value of the source bit cell block indicates the MAC operation result corresponding to a sum of the partial operation results, and
   the readout circuit is configured to match a composite resistance value of the replica bit cell block to the composite resistance value of the source bit cell block by adjusting a resistance value of at least the portion of the plurality of replica bit cells.

3. The MAC computation circuit of claim 2, wherein the matched composite resistance value of the replica bit cell block indicates the digital value of the MAC operation result.

4. The MAC computation circuit of claim 1, wherein the readout circuit comprises a comparator configured to compare the source bit cell block and the replica bit cell block, and is configured to adjust the state of at least the portion of the plurality of replica bit cells based on a comparison result of the comparator.

5. The MAC computation circuit of claim 4, wherein
   the replica bit cell block is connected in series to the source bit cell block, and
   the comparator is configured to compare a composite resistance value of the source bit cell block and a composite resistance value of the replica bit cell block based on a voltage applied to the source bit cell block.

6. The MAC computation circuit of claim 1, wherein the readout circuit is configured to adjust the state of at least the portion of the plurality of replica bit cells using a binary search.

7. The MAC computation circuit of claim 1, wherein the readout circuit is configured to:
   determine states of bit cells of a first group corresponding to ½ of the replica bit cell block based on a result of a comparison between the source bit cell block and the replica bit cell block in a first stage; and
   determine states of bit cells of a second group corresponding to ½ of the remaining ½ of the replica bit cell block based on a result of a comparison between the source bit cell block and the replica bit cell block in a second stage.

8. The MAC computation circuit of claim 7, wherein
   a first bit of the digital value of the MAC operation result is determined corresponding to the states of the bit cells of the first group, and
   a second bit of the digital value of the MAC operation result is determined corresponding to the states of the bit cells of the second group.

9. The MAC computation circuit of claim 1, wherein
   the replica bit cell block comprises a plurality of sub-blocks corresponding to different reference resistance values, and
   the readout circuit is configured to detect a sub-block corresponding to a composite resistance value of the source bit cell block among the plurality of sub-blocks and read out the digital value of the MAC operation result using the detected sub-block.

10. The MAC computation circuit of claim 1, further comprising:
    a plurality of source bit cell blocks including the source bit cell block;
    a plurality of replica bit cell blocks including the replica bit cell block; and
    a plurality of readout circuits including the readout circuit.

11. An electronic apparatus comprising:
    the MAC computation circuit of claim 1; and
    one or more processors configured to generate a recognition result of an input corresponding to the input signal, based on the digital value.

12. A multiply-accumulate (MAC) computation circuit comprising:
    a plurality of local source bit cell blocks configured to each perform a MAC operation on an input signal based on a plurality of source bit cells;

a replica bit cell block comprising a plurality of replica bit cells corresponding to the plurality of source bit cells; and a readout circuit configured to receive individual MAC operation results of the plurality of local source bit cell blocks, adjust a state of at least a portion of the plurality of replica bit cells based on the individual MAC operation results of the plurality of local source bit cell blocks, and read out digital values of the individual MAC operation results of the plurality of local source bit cell blocks using the replica bit cell block.

13. The MAC computation circuit of claim 12, wherein the plurality of local source bit cell blocks share the replica bit cell block and the readout circuit.

14. The MAC computation circuit of claim 12, wherein the readout circuit is configured to sequentially read out the individual MAC operation results of the plurality of local source bit cell blocks.

15. The MAC computation circuit of claim 12, wherein the readout circuit is configured to determine the digital values of the individual MAC operation results by adjusting the state of at least the portion of the plurality of replica bit cells.

16. The MAC computation circuit of claim 12, wherein the plurality of source bit cells are configured to determine resistance values indicating respective partial operation results, a composite resistance value of the local source bit cell blocks indicates the individual MAC operation results corresponding to a sum of the partial operation results, and the readout circuit is configured to match a composite resistance value of the replica bit cell block to the composite resistance value of the local source bit cell blocks by adjusting a resistance value of at least the portion of the plurality of replica bit cells.

17. The MAC computation circuit of claim 12, wherein the readout circuit comprises a comparator configured to compare the plurality of local source bit cell blocks and the replica bit cell block, and is configured to adjust the state of at least the portion of the plurality of replica bit cells based on a comparison result of the comparator.

18. The MAC computation circuit of claim 17, wherein the replica bit cell block is connected in series to a target bit cell block among the plurality of local source bit cell blocks, and the comparator is configured to compare a composite resistance value of the target bit cell block and a composite resistance value of the replica bit cell block based on a voltage applied to the local source bit cell blocks.

19. The MAC computation circuit of claim 12, wherein the readout circuit is configured to adjust the state of at least the portion of the plurality of replica bit cells using a binary search.

20. The MAC computation circuit of claim 12, wherein the plurality of local source bit cell blocks comprise a first local source bit cell block configured to determine a first individual MAC operation result based on the input signal, the replica bit cell block comprises a plurality of sub-blocks corresponding to different reference resistance values, and the readout circuit is configured to detect a sub-block corresponding to a composite resistance value of the first local source bit cell block among the plurality of sub-blocks and read out a first digital value of the first individual MAC operation result using the detected sub-block.

21. A multiply-accumulate (MAC) computation method comprising:

determining a multiply-accumulate (MAC) operation result of an input signal based on a plurality of source bit cells;

adjusting, by a readout circuit, a state of at least a portion of a plurality of replica bit cells corresponding to the plurality of source bit cells, based on the MAC operation result; and reading out a digital value of the MAC operation result using a replica bit cell block comprising the plurality of replica bit cells.

22. A multiply-accumulate (MAC) computation method comprising:

controlling a replica bit cell block by setting, for each of groups of the replica bit cell block, replica bit cells of the group to have either one of a first resistance value and a second resistance value, based on a composite resistance value of a source bit cell block, wherein the composite resistance value represents a MAC operation result of an input signal; and reading out a digital value of the MAC operation result of the source bit cell block by comparing, at a readout circuit, the composite resistance value of the source bit cell block and composite resistance values of the replica bit cell block generated by the controlling.

23. The method of claim 22, wherein, in a first stage, the controlling comprises setting each of replica bit cells of a first group of the groups to have the first resistance value and each of replica bit cells of remaining groups of the groups to have the second resistance value, and the reading out comprises determining a first bit of the digital value by comparing the composite resistance value of the source bit cell block and a composite resistance value of the replica bit cell block generated by the controlling in the first stage.

24. The method of claim 23, wherein the determining of the first bit comprises determining the first bit to be a first value in response to the composite resistance value of the source bit cell block being greater than or equal to the composite resistance value of the replica bit cell block generated by the controlling in the first stage.

25. The method of claim 23, wherein the determining of the first bit comprises determining the value of the first bit to be a second value in response to the composite resistance value of the source bit cell block being less than the composite resistance value of the replica bit cell block generated by the controlling in the first stage, and the first value is greater than the second value.

26. The method of claim 23, wherein the first bit is a most significant bit (MSB) of the digital value.

27. The method of claim 22, wherein a maximum value of the composite resistance value of the source bit cell block is twice a maximum value of the composite resistance value of the replica bit cell block generated by the controlling in the first stage.

28. The method of claim 22, wherein a number of the replica bit cells included in the first group is twice a number of replica bit cells included in a second group of the groups.

29. An electronic apparatus comprising:

a multiply-accumulate (MAC) computation circuit comprising:

a source bit cell block configured to determine a MAC operation result of an input signal based on a plurality of source bit cells;

a replica bit cell block comprising a plurality of replica bit cells corresponding to the plurality of source bit cells; and a readout circuit configured to receive the MAC operation result, adjust a state of at least a portion of the plurality of replica bit cells based on the MAC operation result, and read out a digital value of the MAC operation result using the replica bit cell block; and one or more processors configured to generate a recognition result of an input corresponding to the input signal, based on the digital value.

30. The apparatus of claim 29, wherein the recognition result corresponds to any one or any combination of any two or more of object classification, object recognition, speech recognition, and image recognition.

* * * * *